United States Patent
Oshima et al.

(10) Patent No.: US 7,000,967 B2
(45) Date of Patent: Feb. 21, 2006

(54) SLIDABLE VEHICLE SEAT PROVIDED WITH AUTOMOTIVE ELECTRONIC PARTS

(75) Inventors: Nao Oshima, Tochigi (JP); Hirokazu Horii, Tochigi (JP); Hiromasa Matsushiro, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 10 days.

(21) Appl. No.: 10/747,432

(22) Filed: Dec. 29, 2003

(65) Prior Publication Data

US 2004/0159764 A1 Aug. 19, 2004

(30) Foreign Application Priority Data

| Dec. 27, 2002 | (JP) | ............................. 2002-381337 |
| Dec. 27, 2002 | (JP) | ............................. 2002-381514 |
| Dec. 27, 2002 | (JP) | ............................. 2002-381585 |
| Dec. 27, 2002 | (JP) | ............................. 2002-381624 |
| Dec. 27, 2002 | (JP) | ............................. 2002-381723 |

(51) Int. Cl.
*B60N 2/02* (2006.01)

(52) U.S. Cl. .............................. 296/65.13; 296/65.01; 248/429; 307/10.1; 297/344.1

(58) Field of Classification Search ................ 248/429, 248/419, 424; 297/344.1, 250.1, 344.13, 297/477; 296/65.13, 65.01, 63.02, 65.14; 307/10.1
See application file for complete search history.

(56) References Cited

U.S. PATENT DOCUMENTS

| 5,848,775 | A | * | 12/1998 | Isomura et al. ............. 248/430 |
| 5,890,779 | A | * | 4/1999 | Blackburn et al. .......... 307/10.1 |
| 6,216,995 | B1 | * | 4/2001 | Koester ...................... 248/429 |
| 6,267,430 | B1 | * | 7/2001 | Cresseaux ................ 296/65.13 |

FOREIGN PATENT DOCUMENTS

| JP | 1120523 | 1/1999 |
| JP | 11198743 | 7/1999 |

* cited by examiner

*Primary Examiner*—Anita M. King
(74) *Attorney, Agent, or Firm*—Dann, Dorfman, Herrell and Skillman, P.C.

(57) ABSTRACT

A slidable vehicle seat with automotive electronic parts, includes an electrically wiring construction for the parts, and a longitudinal housing member provided at a floor section of the vehicle, and having a longitudinally extending slit, the wiring construction including a first electrical wiring member led out of the parts, a second electrical wiring member movably housed within the housing member so as to be capable of traveling along the housing member according to movement of the seat, and a third electrical wiring member connected to a power source the second wiring member having first and second ends, the first end being led out of the housing member via the slit and connected to an end of the first wiring member which is distal the parts, and the second end penetrating the housing member, and connected to an end of the third electrical wiring member which is distal the power source.

56 Claims, 16 Drawing Sheets

SLIDABLE VEHICLE SEAT PROVIDED WITH AUTOMOTIVE ELECTRONIC PARTS

BACKGROUND OF THE INVENTION

1. Field of the Invention

This invention relates to a sidable vehicle seat provided with automotive electronic parts, in which first electrical wiring means led out of the automotive electronic parts is connected through second electrical wiring means to third electrical wiring means which is connected to a power source and passes in a floor section of a vehicle.

2. Description of the Related Art

Generally, there has been proposed a vehicle seat which is provided with automotive electronic parts for various systems, for example, a power slide mechanism, an electrically powered recliner device, an electrically powered lumber support adjuster, an electrically powered side support adjuster, an electrically powered thigh support adjuster, a power height adjuster, and a position sensor.

As a power source for the automotive electronic parts, there is employed a battery for a vehicle, or a capacitor. First electrical wiring means which is led out of the automotive electronic parts is connected through second electrical wiring means to third electrical wiring means which is connected to the power source and led out of a floor section of a vehicle.

In a case where a vehicle seat provided with the automotive electronic parts is constructed as a slidable vehicle seat, the vehicle seat is moved between a foremost position and a rearmost position. Therefore, it is essential that the second electrical wiring means has a long length which allows the second electrical wiring means to follow the movement of the vehicle seat. That is, the second electrical wiring means is required to have an excess length portion which allows the second electrical wiring means to travel to the foremost and rearmost positions according to the movement of the vehicle seat.

Japanese Patent Application Laid-Open No. Hei. 11-20523 discloses such a vehicle as a recreation vehicle that has first and second rear seats. The rear seats are adapted to be moved forward and rearward through seat tracks that have each a long length. In order to obtain a storage space for various loads, the rear seats are adapted to be moved forward and rearward along the seat tracks with seat cushions thereof being jumped up together with seat backs thereof.

Where each of the rear seats is provided with such automotive electronic parts as described above, first electrical wiring means which is led out of the automotive electronic parts may be connected through second electrical wiring means to third electrical wiring means which is connected to a power source and led out of a floor section of a vehicle. In this case, the second electrical wiring means is required to have a long length. This causes the problem of treating the second conducting wire means to occur. That is, since an excess portion of the second electrical wiring means spreads over the floor section of the vehicle as the vehicle seat is moved to the foremost position or the rearmost position and a middle position, the excess portion of the second electrical wiring means may interfere with passenger's feet.

Japanese Patent Application Laid-Open No. Hei. 11-198743 discloses a slidable vehicle seat which is provided with a construction for connecting first electrical wiring means of automotive electronic parts through second electrical wiring means to third electrical wiring means which is connected to a power source and led out of a floor section of a vehicle. The conventional seat is provided with leg portions that are combined with stationary rails so as to be slid along the stationary rails. The first electrical wiring means led out of the automotive electronic parts is connected to one end of the second electrical wiring means via a first connector attached to the seat. The third electrical wiring means which is connected to a power source and led out of a floor section of a vehicle is connected to the other end of the second electrical wiring means via a second connector which is attached to a support member which stands up from one of the stationary rails. The second electrical wiring means is supported in a turned-down condition by the first and second connectors. As the seat is slid along the stationary rails, the second electrical wiring means is deformed and pulled.

In the conventional seat, the second electrical wiring means extends from the first connector attached to the seat to the second connector attached to the support member standing up from the one of stationary rails. Therefore, the second electrical wiring means and the support member will prevent a space under the seat from being effectively used. Furthermore, in the vehicle seat, since the second electrical wiring means is exposed to outside, it does not look nice.

SUMMARY OF THE INVENTION

The present invention has been made with a view to overcome the forgoing problem of the prior art vehicle seats.

It is therefore an object of the present invention to provide a slidable vehicle seat provided with automotive electronic parts, in which second electrical wiring means does not interfere with passenger's feet.

It is another object of the present invention to provide a slidable vehicle seat provided with automotive electronic parts, which facilitates efficient using of a space under a seat.

It is still another object of the present invention to provide a slidable vehicle seat provided with automotive electronic parts, which adds to the appearance of the interior of a vehicle.

It is still another object of the present invention to provide a slidable vehicle seat provided with automotive electronic parts, in which second electrical wiring means can follow movement of the seat.

It is yet another object of the present invention to provide a slidable vehicle seat provided with automotive electronic parts, in which dirt and/or dust is prevent from adhering to second electrical wiring means.

In accordance with one aspect of the present invention, there is provided a slidable vehicle seat that is provided with automotive electronic parts. The slidable vehicle seat comprises a seat track mechanism for allowing the seat to be moved forward and rearward in a vehicle, and an electrically wiring construction for the automotive electronic parts, longitudinal housing means disposed adjacent the seat track mechanism and provided at a floor section of the vehicle, the housing means having a slit extending along a longitudinal direction of the housing means, the electrically wiring construction comprising first, second and third electrical wiring means, the first electrical wiring means being led out of the automotive electronic parts, the third electrical wiring means being connected to a power source and passing in the floor section of said vehicle, the second electrical wiring means being movably housed within the housing means so as to be capable of travelling along the housing means according to movement of the seat, the second electrical wiring means having first and second ends, the first end of the second wiring means being led out of the housing means via the slit and connected to an end of the first electrical wiring means which is distal the automotive electronic parts, and the second end of the second electrical wiring means penetrating the housing means, secured to the housing means and connected to an end of the third electrical wiring means which is distal the power source.

The second electrical wiring means may comprise conducting wires and holder means for bundling and holding the conducting wires. The holder means has a flexible, longitudinal hollow body that is formed into a substantially chain-shape and comprises a plurality of piece members which are connected to one another. The conducting wires are received in the hollow body of the holder means.

The second electrical wiring means may has a flexible longitudinal body which is formed into a substantially belt-shape and comprises conducting wires which are disposed adjacent one another in parallel. The longitudinal body of the second electrical wiring means is housed within the housing means in a constantly curved condition.

The second electrical wiring means may comprise a spiral isolated conductor.

The second electrical wiring means may comprise a straight isolated conductor. In this case, a reel for taking up the straight isolated conductor may be arranged within the housing means.

The slit of the housing means may be covered with cover means. The cover means comprises cover members that are mounted on the housing means and disposed adjacent each other. The cover members have lip portions provided at adjacent ends thereof.

The housing means may be provided with shutter means for shutting the slit of the housing means. The shutter means is movably supported to the housing means so as be capable to travel along the longitudinal direction of the housing means. In this case, the first end of the second wiring means penetrates the shutter means. The shutter means has a longitudinal endless body which is formed into a substantially caterpillar shape and comprises a plurality of narrow strips which are disposed adjacent one another and connected to one another by hinge pins. The shutter means may be movably supported to the housing means through shutter guide means. The first electrical wiring means may be provided with a first coupler at an end thereof which is distal the automotive electronic parts. The second electrical wiring means may be provided with a second coupler at the first end thereof. The second coupler is supported to the shutter means through a coupler holder. The first and second couplers are coupled to each other.

The housing means may comprise a longitudinal groove formed in the floor section of the vehicle. The second electrical wiring means is movably housed within the groove. The longitudinal groove is covered with second cover members which are mounted on the floor section of the vehicle. The second cover members are spaced apart from each other, whereby the slit is provided between the second cover members. The second cover members may have lip portions provided at adjacent ends thereof.

In accordance with another aspect of the present invention, there is provided slidable vehicle seats which are provided at bodies thereof with automotive electronic parts. The vehicle seats comprise a seat track mechanism for allowing the seats to be moved forward and rearward in a vehicle, an electrically wiring construction for automotive electronic parts of each of the seats, and longitudinal housing means disposed adjacent the seat track mechanism and provided at a floor section of the vehicle, the housing means having a slit extending along a longitudinal direction of the housing means, the electrically wiring construction comprising first, second and third electrical wiring means, the first electrical wiring means being led out of the automotive electronic parts, the third electrical wiring means being connected to a power source and passing in the floor section of the vehicle, the second electrical wiring means being movably housed within the housing means so as to be capable of travelling along the housing means according to movement of corresponding one of the seats, the second electrical wiring means having first and second ends, the first end of the second wiring means being led out of the housing means via the slit and connected to an end of the first electrical wiring means which is distal the automotive electronic parts, and the second end of the second electrical wiring means penetrating the housing means, secured to the housing means and connected to an end of the third electrical wiring means which is distal the power source.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENTS

A slidable vehicle seat provided with automotive electronic parts, according to the present invention will be discussed hereinafter with reference to the accompanying drawings. The automotive electronic parts comprise automotive electronic parts for various systems, for example, a power slide mechanism, an electrically powered recliner device, an electrically powered lumber support adjuster, an electrically powered side support adjuster, an electrically powered thigh support adjuster, a power height adjuster, a side air-bag module, an air conditioner, and a position sensor.

The automotive electronic parts are electrically connected to a power source such as a battery for a vehicle or a capacitor by causing first electrical wiring means led out of the automotive electronic parts to be connected via second electrical wiring means (housed within housing means) to third electrical wiring means which is connected to the power source.

Figure 1:
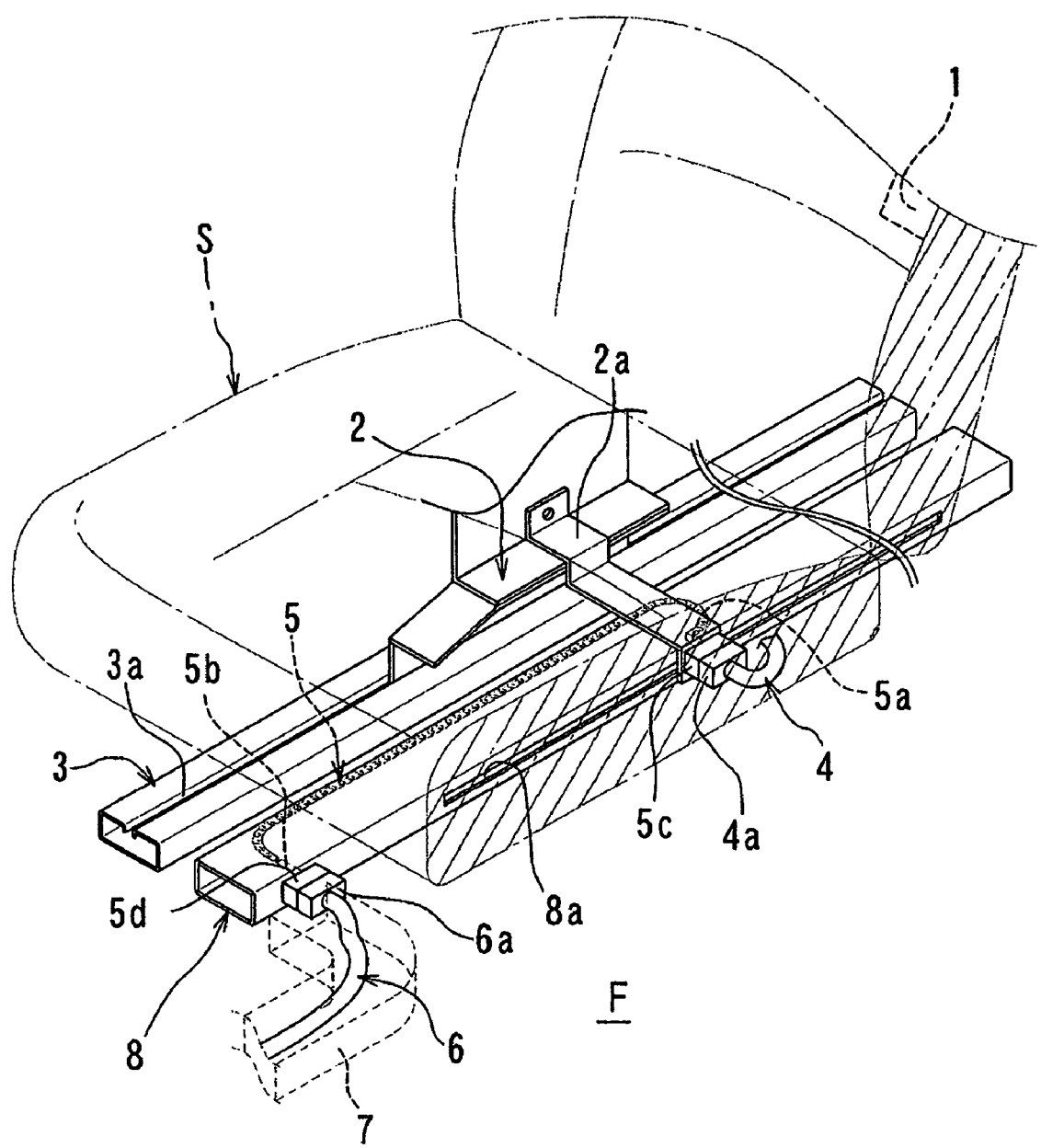
FIG. 1 is a schematic perspective view of a slidable vehicle seat according to a first embodiment of the present invention.

Referring to FIG. 1, there is illustrated the vehicle seat S (shown in phantom) provided with the automotive electronic parts 1 (only one automotive electronic component 1 is shown in FIG. 1), in accordance with a first embodiment of the present invention. The vehicle seat S is adapted to be moved forward and rearward in a vehicle through a seat track mechanism. The seat track mechanism includes a pair of substantially parallel movable rails 2 (only one movable rail 2 is shown in FIG. 1) attached to a lower portion of the vehicle seat in slidable relationship with a pair of substantially parallel stationary rails 3 (only one stationary rail 3 is shown in FIG. 1) which are attached to a floor section F of the vehicle. Each of the stationary rails 3 has a longitudinally extending opening 3a through which a corresponding movable rail 2 is slidably combined with the stationary rail 3 and slid along.

The first electrical wiring means 4 which is led out of the automotive electronic parts 1 provided in the seat S and which is then led out of the seat S is provided with a first coupler 4a at an end thereof which is distal the automotive electronic parts 1. The second electrical wiring means 5 has first and second ends 5a, 5b, a second coupler 5c provided at the first end 5a thereof, and a third coupler 5d provided at the second end 5b thereof. The third electrical wiring means 6 that is connected to the power source (not shown) passes a passageway 7 provided under the floor section F of the vehicle and led out of the floor section F of the vehicle. The third electrical wiring means 6 is provided with a fourth coupler 6a at an end thereof which is distal the power source. The second coupler 5c of the second electrical wiring means 5 and the third coupler 5d of the second electrical wiring means 5 are coupled to the first coupler 4a of the first electrical wiring means 4 and the fourth coupler 6a of the third electrical wiring means 6, respectively. In the illustrated embodiment, each of the first, second and third electrical wiring means 4, 5, 6 comprises an isolated conductor in which conducting wires corresponding in number to the automotive electronic parts 1 are bundled and coated with insulating materials. If only one automotive electronic component 1 is provided at the vehicle seat, each of the first, second and third wiring means 4, 5, 6 comprises only one conducting wire.

Housing means 8 for housing the second electrical wiring means 5 is attached to the floor section F of the vehicle and disposed adjacent one of the stationary rails 3 in parallel with the one of the stationary rails 3. The housing means 8 comprises a hollow box-like longitudinal body having a longitudinal slit 8a of a predetermined width extending along a longitudinal direction of a side portion thereof. The second electrical wiring means 5 is movably housed within the housing means 8 with the third coupler 5d thereof projecting out of a predetermined region of the side portion of the housing means 8 and being secured to the side portion of the housing means 8. The fourth coupler 6a of the third electrical wiring means 6 is coupled to the third coupler 5d of the second electrical wiring means 5. The first end 5a of the second electrical wiring means 5 housed within the housing means 8 is led out of the housing means 8 through the slit 8a of the housing means 8. The second coupler 5c which is provided at the first end 5a of the second electrical wiring means 5 is supported and secured to a bracket arm 2a which extends toward the housing means 8 from one of the movable rails 2 which is slidably combined with the stationary rail 3 which is adjacent the housing means 8. Therefore, when the seat S is moved along the stationary rails 3, the second coupler 5c is moved along the slit 8a of the housing means 8 while causing the second electrical wiring means 5 to be traveled within the housing means 8. The first coupler 4a provided at the first electrical wiring means 4 which is led out of the seat S is coupled to the second coupler 5c of the second electrical wiring means 5.

Figure 2:
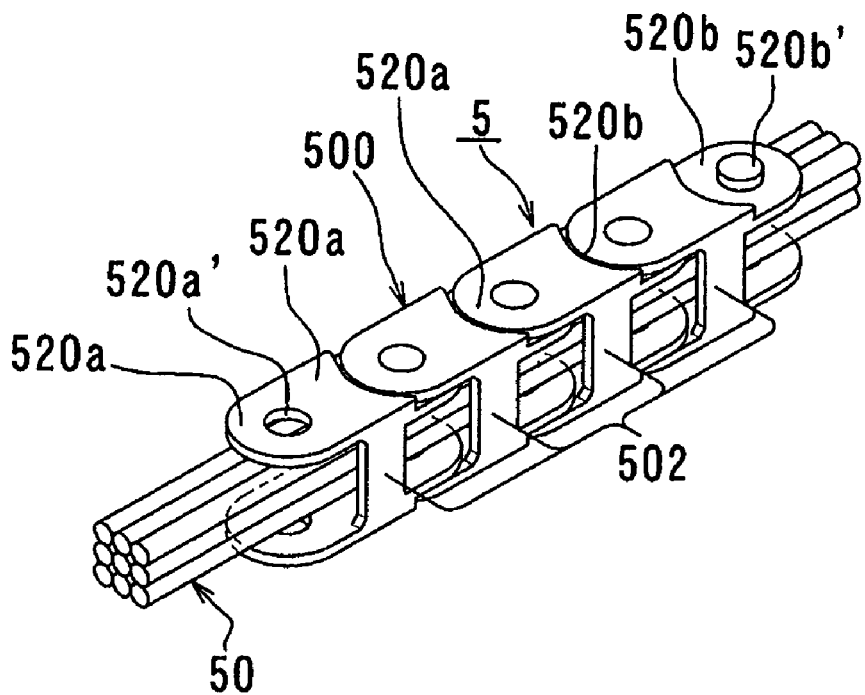
FIG. 2 is a schematic fragmentary perspective view of second electrical wiring means which is employed in the vehicle seat shown in FIG. 1.

Referring now to FIG. 2, there is one example of the second electrical wiring means 5. The second electrical wiring means 5 comprises a plurality of flexible conducting wires 50 coated with insulating materials, and holder means 500 for bundling and holding the flexible conducting wires 50. The second and third couplers are provided at the both ends of the conducting wires 50. The holder means 500 comprises a longitudinal hollow body of a substantially O-shape in cross-section which is formed into a substantially chain-shape. The flexible conducting wires 50 are received in the longitudinal hollow body of the holder means 500. The longitudinal hollow body of the holder means 500 comprises a plurality of piece members 502 connected to each other.

Figure 3:
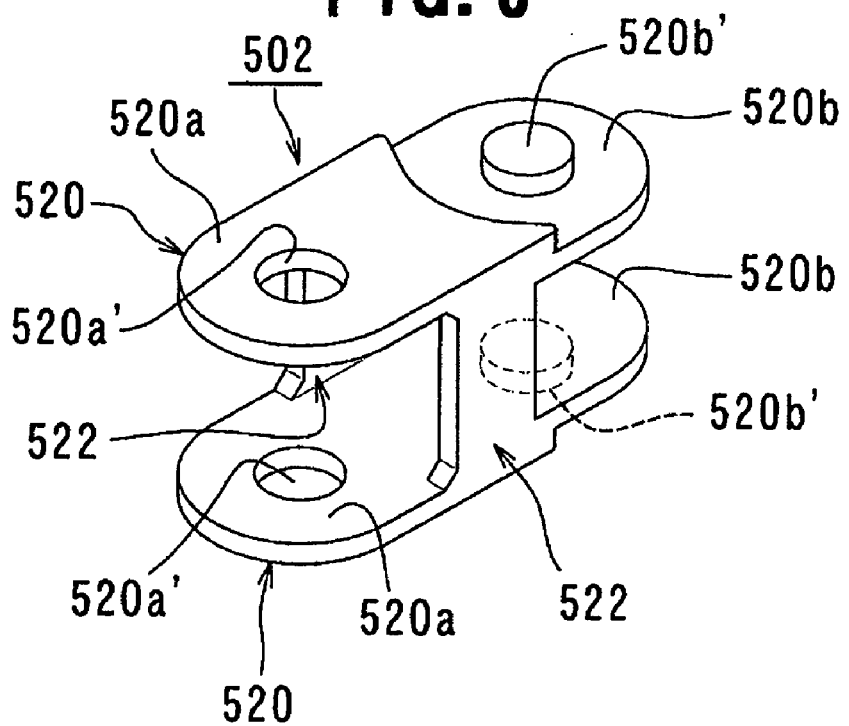
FIG. 3 is a schematic perspective view of one of piece members making up the second electrical wiring means of FIG. 2.

Referring to FIG. 3, there is illustrated one of the piece members 502 making up the holder means 500. The piece member 502 comprises a pair of spaced apart, substantially ellipse-shaped plate sections 520 and a pair of spaced apart connecting sections 522 interconnecting the ellipse-shaped plate sections 520. Each of the ellipse-shaped plate sections 520 has a first semicircular end portion 520a and a second recessed end portion 520b having a semicircular step. The first semicircular end portion 520a of the ellipse-shaped plate section 520 is formed with a through-hole 520a'. The second recessed end portion 520b' of the ellipse-shaped plate section 520 is provided with a support pin 520b' standing up therefrom. The respective piece members 502 are connected to one another by causing the first semicircular end portions 620a of the piece members 502 to be superposed on the second recessed end portions 520b of adjacent piece members 502, causing the first semicircular end portions of the piece members 502 to be engaged with the semicircular step portions of the adjacent piece members 502, and causing the support pins 520b' of the adjacent piece members 502 to be inserted through the through-holes 520a' of the piece members 502. In the holder means 500 constructed as discussed above, the respective piece members 502 are turnable around the support pins 520b' of the adjacent piece members 502, whereby the flexible conducting wires 50 can be freely deformed.

Figure 4:
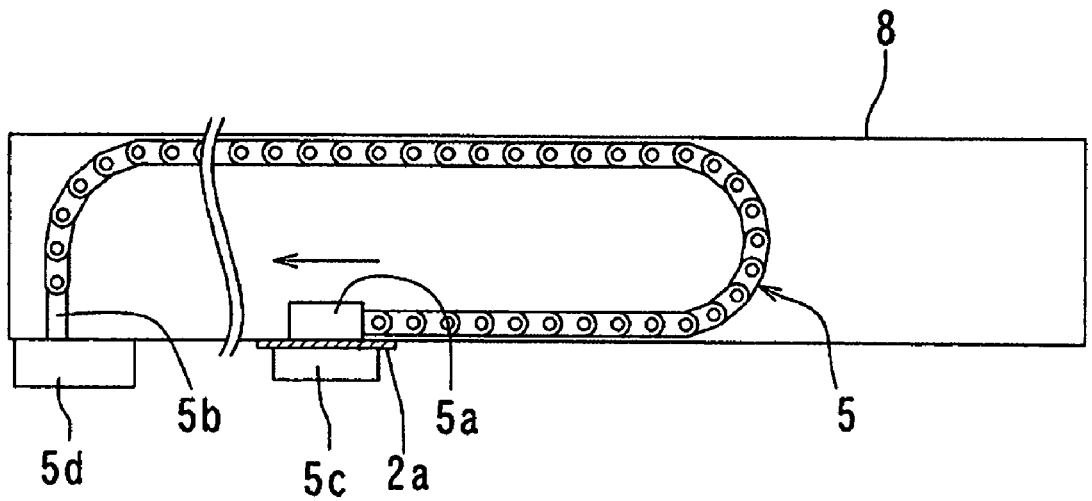
FIGS. 4 and 5 are each a schematic view of assistance in explaining travelling of the second electrical wiring means.
Figure 5:
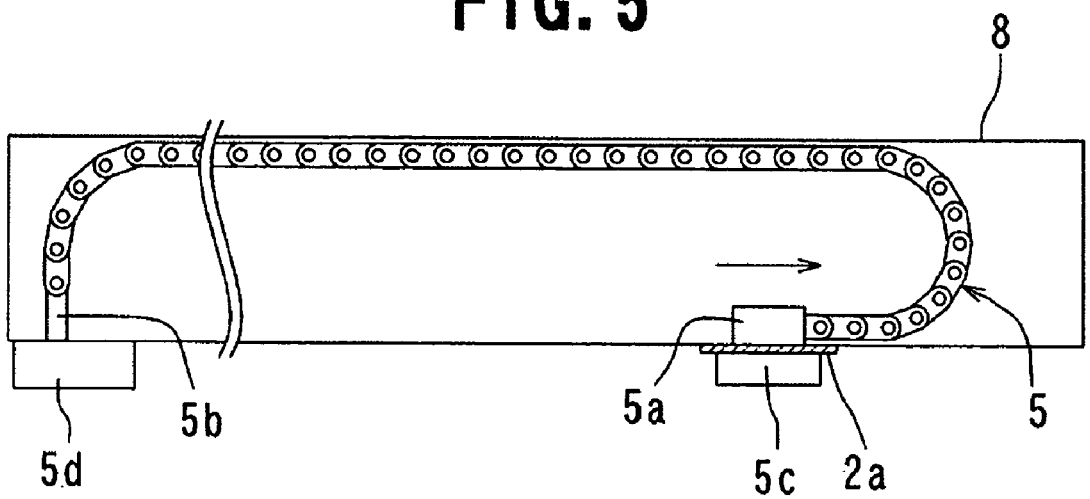

Referring now to FIGS. 4 and 5, travelling of the second electrical wiring means 5 will be discussed hereinafter. In the vehicle seat of the first embodiment constructed as discussed above, the second coupler 5c of the second electrical wiring means 5 is supported and secured to the bracket arm 2a (FIG. 1) which extends toward the housing means 8 from the movable rail 2, so that when the vehicle seat is moved along the stationary rails 3 in a forward direction shown in FIG. 4 or in a rearward direction shown in FIG. 5, the second coupler 5c of the second electrical wiring means 5 is moved along the slit 8a (FIG. 1) of the housing means 8 while causing the second electrical wiring means 5 to be traveled along the housing means 8. At this time, the second electrical wiring means 5 can be traveled while being flexibly deformed.

The second electrical wiring means 5 is housed within the housing means 8 as discussed above, so that the second electrical wiring means 5 can be traveled along the housing means 8 without operatively projecting out of the housing means 8. Therefore, the second electrical wiring means 5 does not interfere with the passenger's feet. A space under the vehicle seat can be effectively used. Furthermore, the second electrical wiring means 5 is housed within the housing means 8, thus adding to the appearance of the interior of the vehicle.

Figure 6:
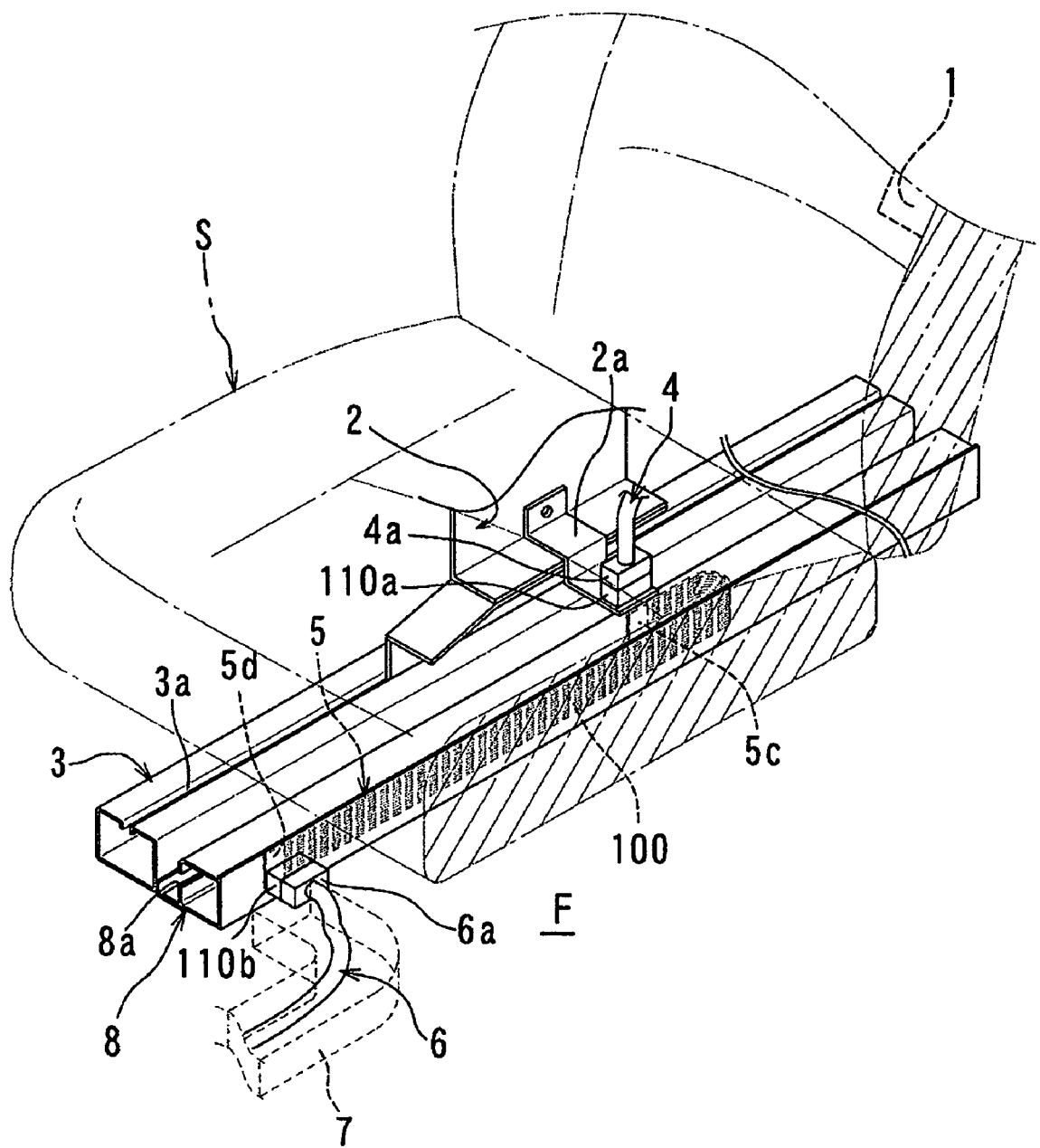
FIG. 6 is a schematic perspective view showing a first modification of the vehicle seat shown in FIG. 1.

Referring to FIG. 6, there is illustrated a first modification of the vehicle seat shown in FIG. 1. The first modification is substantially similar to the seat of FIG. 1 except that the second electrical wiring means 5 has a substantially longitudinal body 100 which is formed into a belt-shape, the second coupler of the second electrical wiring means 5 is connected to the first coupler 4a of the first electrical wiring means 4 via a fifth coupler 110a, the third coupler 5d of the second electrical wiring means 5 is connected to the fourth coupler 6a of the third electrical wiring means 6 via a sixth coupler 110b, and the housing means 8 is connected to a side portion of the stationary rail 3. In FIG. 6, components that are substantially similar to those of the vehicle seat of FIG. 1 are denoted by the same reference numerals. The description of them win not be repeated hereinafter.

Figure 7:
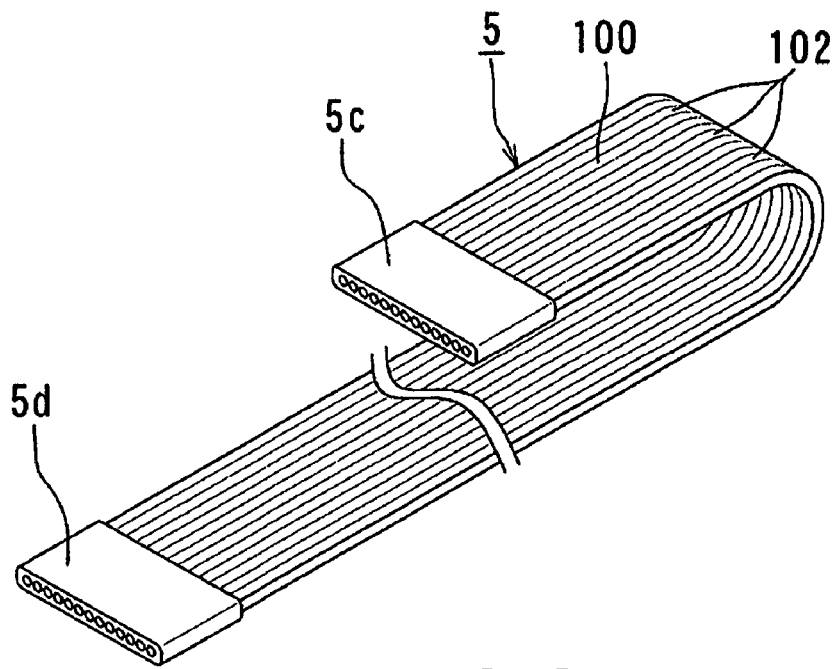
FIG. 7 is a schematic perspective view of second electrical wiring means that is employed in the vehicle seat of FIG. 6.

Referring now to FIG. 7, there is illustrated the longitudinal body 100 of the second electrical wiring means 5. The longitudinal body 100 comprises a plurality of flexible conducting wires 102 that are disposed adjacent one another in parallel and coated with insulating materials, and the second and third couplers 5c, 5d provided at the first and second ends of the longitudinal body 100. As shown in FIG. 6, the second electrical wiring means 5 is movably disposed within the housing means 8 in a constantly curved condition in such a manner that both general surfaces of the longitudinal body 100 are raised up from a bottom portion of the housing means 8.

Figure 8:
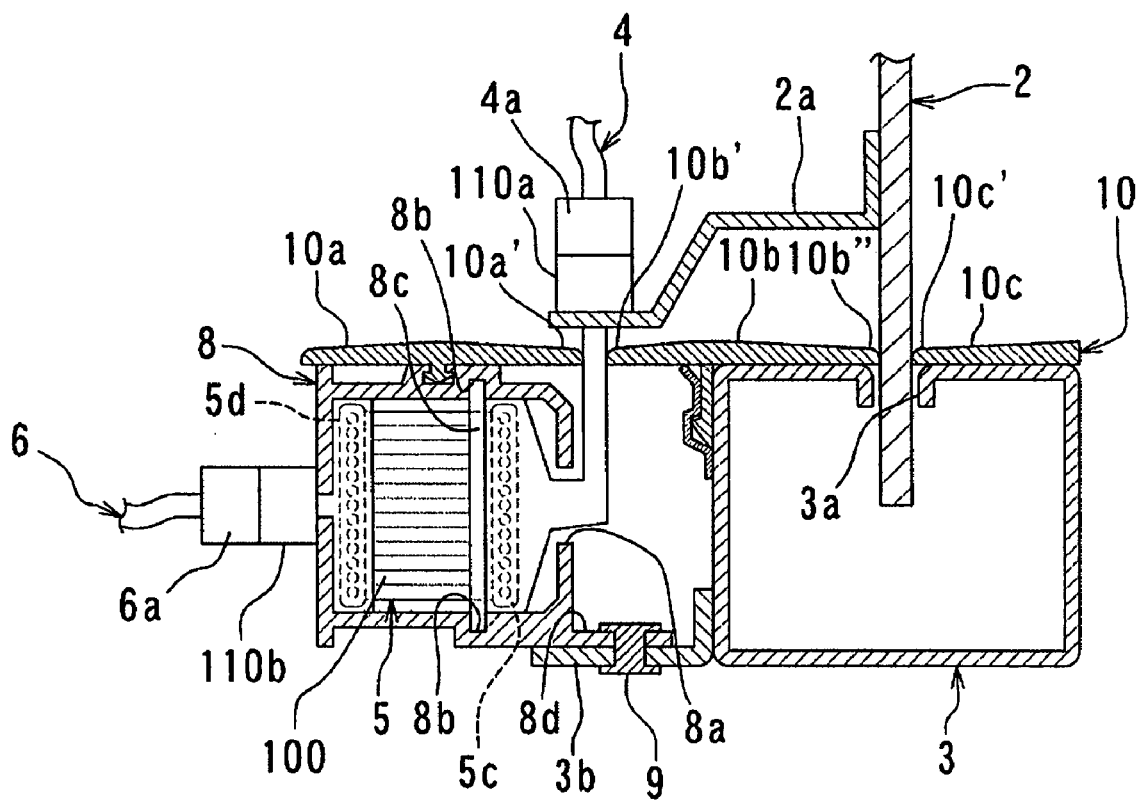
FIG. 8 is a schematic sectional view of the vehicle seat shown in FIG. 6.

Referring to FIG. 8, the housing means 8 has a pair of longitudinally extending grooves 8b formed in inner surfaces of upper and bottom portions thereof and aligned with each other. A guide plate 8c is slidably received in the grooves 8b. The fifth coupler 110a penetrates the bracket arm 2a, hangs down from the bracket arm 2a and extends into the housing means 8 through the slit 8a of the housing means 8. The first coupler 4a of the first electrical wiring means 4 is coupled to an upper portion of the fifth coupler 110a. The fifth coupler 110a is attached at a lower portion thereof to the guide plate 8c. The second coupler 5c of the second electrical wiring means 5 is coupled to the lower portion of the fifth coupler 110a within the housing 8, whereby the second coupler 5c of the second electrical wiring means 5 is connected to the first coupler 4a of the first electrical wiring means 4 via the fifth coupler 110a. When the seat is moved along the stationary rails 3, the second coupler 5c of the second electrical wiring means 5 can be traveled within the housing means 8 while being guided along the grooves 8b of the housing means 8 and drawing the second electrical wiring means 5. The third coupler 5d of the second electrical wiring means 5 is coupled to the sixth coupler 110b which is projected out of the side portion of the housing means 8 and supported to the side portion of the housing means 8. The fourth coupler 6a of the third electrical wiring means 6 is coupled to the sixth coupler 110b, whereby the third coupler 5d of the second electrical wiring means 100 is connected to the fourth coupler 6a of the third electrical wiring means 6 through the sixth coupler 110b.

The housing means 8 has a flange portion 8d projecting laterally therefrom and extending along the longitudinal direction of the housing means 8. In this connection, the stationary rail 3 has a bracket plate 3b projecting laterally therefrom and extending along the longitudinal direction of the stationary rail 3. The housing means 8 is connected to the stationary rail 3 by causing the flange portion 8d of the housing means 8 to be superposed on the bracket plate 3b of the stationary rail 3 and causing the flange portion 8d and the bracket plate 3b to be fastened together by rivets 9.

In order to prevent dirt and/or dust from going into the housing means 8 through the slit 8a of the housing means 8, and from going into the stationary rail 3 through the opening 3a of the stationary plate 3, cover means 10 is employed. The cover means 10 comprises first, second, and third cover members 10a, 10b, 10c. The cover means 10 is mounted on upper portions of the housing means 8 and stationary rail 3 in such a manner that the first, second, and third cover members 10a, 10b, 10c are disposed adjacent one another. A first lip portion 10a' is provided at an end of the first cover member 10a which is adjacent the second cover member 10b. Also, a second lip portion 10b' and a third lip portion 10b" are provided at one end of the second cover member 10b which is adjacent the first cover member 10a, and at the other end of the second cover member 10b which is adjacent the third cover member 10c, respectively. Furthermore, a fourth lip portion 10c' is provided at an end of the third cover member 10c which is adjacent the second cover member 10b. The fifth coupler 10a is slidable along a space between the first lip portion 10a' of the first cover member 10a and the second lip portion 10b' of the second cover member 10b. The movable rail 2 is slidable along a space between the third lip portion 10b" of the second cover member 10b and the fourth lip portion 10c' of the third cover member 10c.

Figure 9:
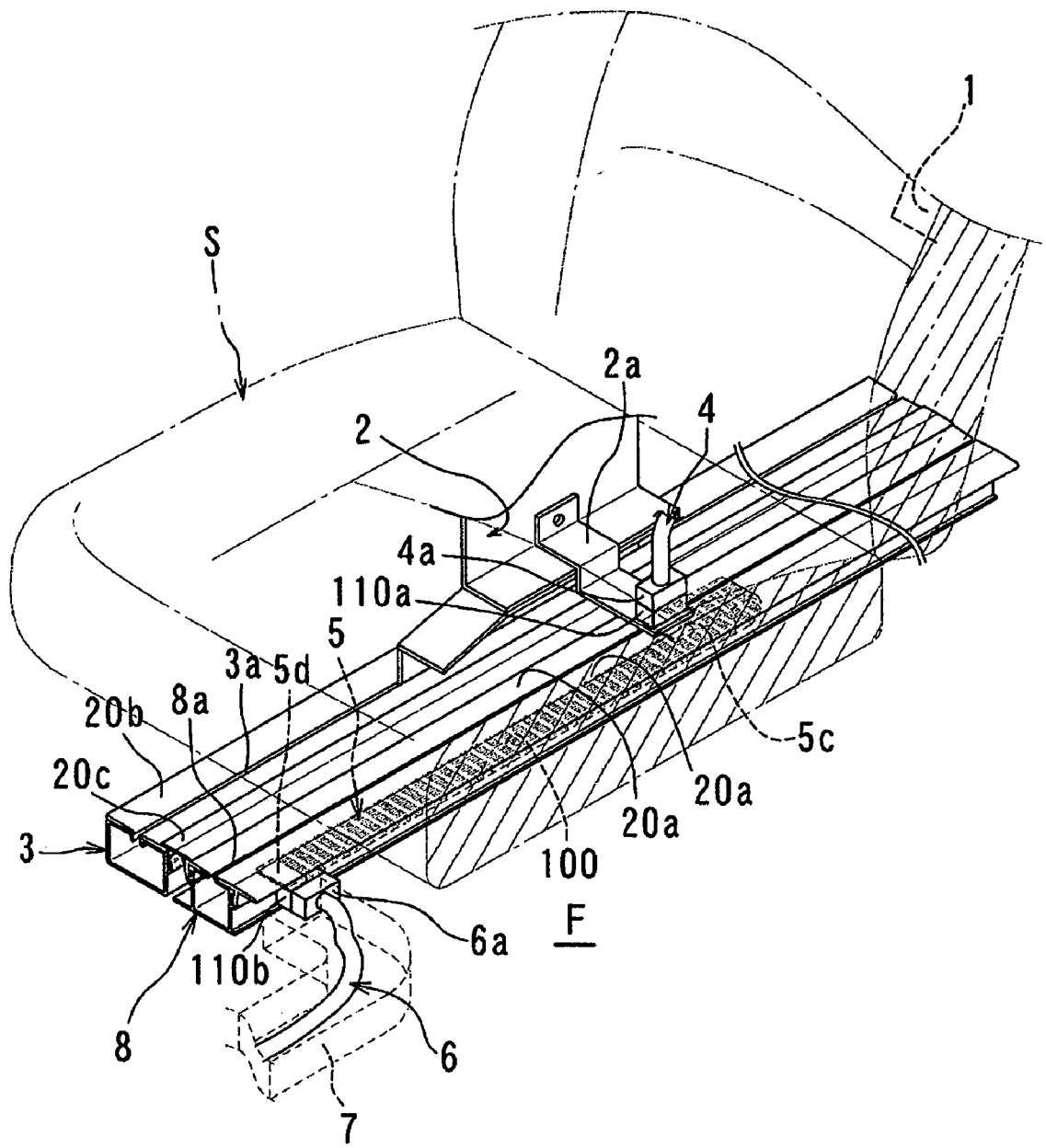
FIG. 9 is a schematic perspective view showing a second modification of the vehicle seat.
Figure 10:
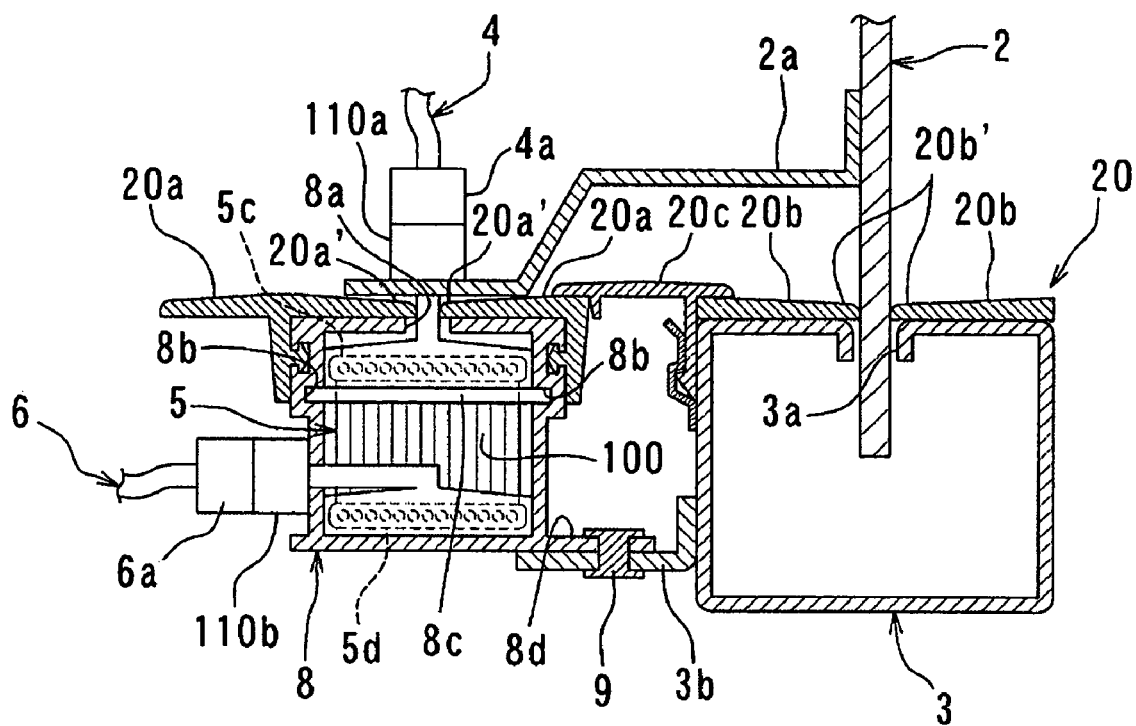
FIG. 10 is a schematic sectional view of the vehicle seat shown in FIG. 9.

Referring to FIGS. 9 and 10, there is illustrated a second modification of the vehicle seat shown in FIG. 1. This modification is substantially similar to the vehicle seat of FIGS. 6 and 8 except that the second electrical wiring means 6 is movably disposed within the housing means 8 with the general surfaces of the longitudinal body 100 facing the bottom and upper portions of the housing means 8, the slit 8a of the housing means 8 is formed in the upper portion of the housing means 8 so as extend along the longitudinal direction of the housing means 8, and different cover means 20 is employed. In FIGS. 9 and 10, components that are substantially similar to those of the vehicle seats shown in FIGS. 1, 6 and 8 are designated by the same reference numerals. The description of them will not be repeated.

The grooves 8b of the housing means 8 are formed in inner surfaces of both sides of the housing means 8. The guide plate 8c is slidably received in the grooves 8b. The cover means 20 comprises a pair of first cover members 20a for covering the housing means 8 mounted on the housing means 8, a pair of second cover members 20b for covering the stationary rail 3 mounted on the stationary rail 3, and a third cover member 20c interconnecting the first and second cover members 20a, 20b. First lip portions 20a' are provided at ends of the first cover members 20a that are adjacent each other. Also, second lip portions 20b' are provided at ends of the second cover members 20b which are adjacent each other.

Figure 11:
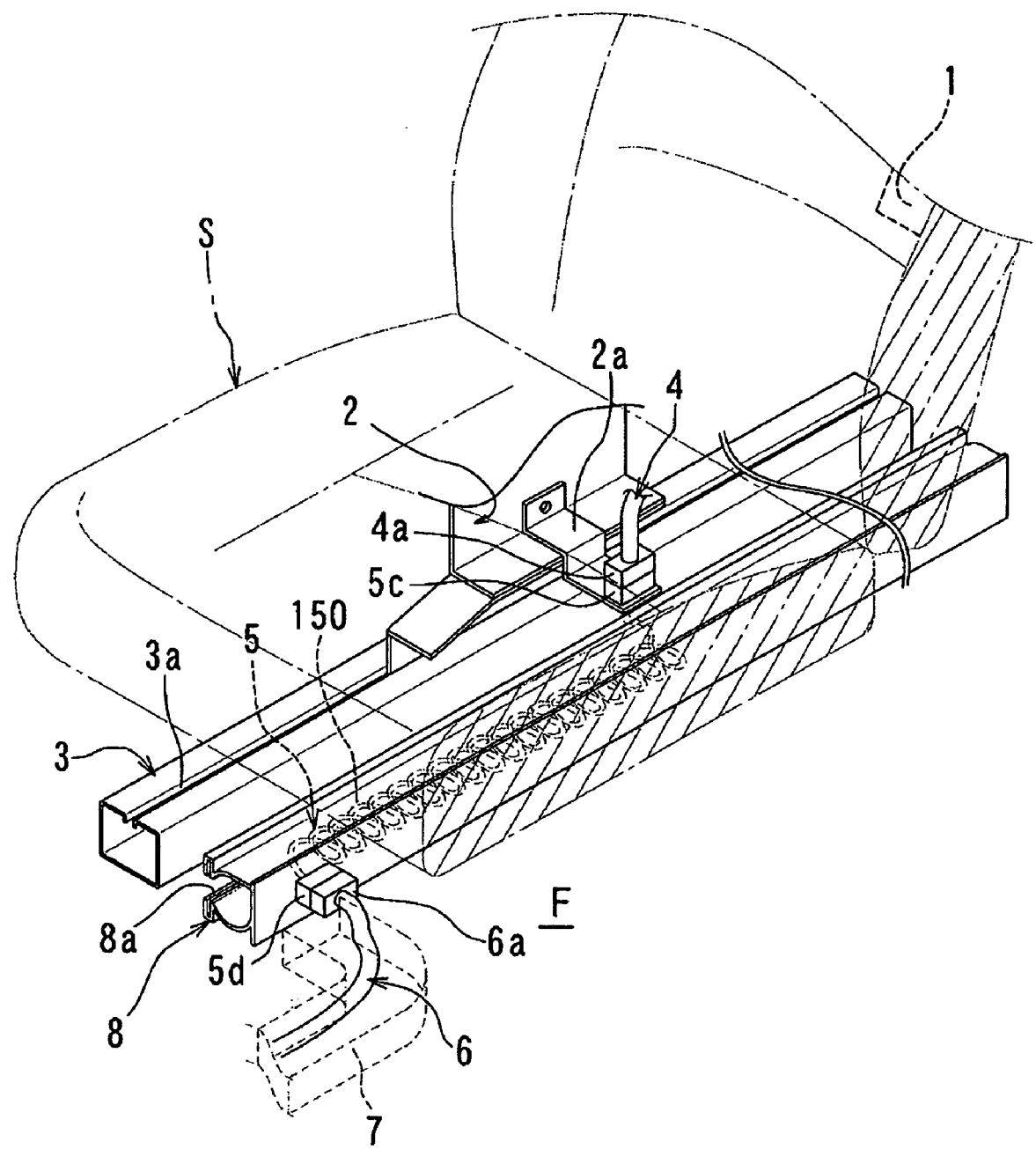
FIG. 11 is a schematic perspective view showing a third modification of the vehicle seat.

Referring to FIG. 11, there is illustrated a third modification of the vehicle seat shown in FIG. 1. This modification is substantially similar to the vehicle seat shown in FIG. 1 except that the second electrical wiring means 5 has a spiral body 150. In FIG. 11, components that are substantially similar to those of the vehicle seat shown in FIG. 1 are denoted by the same reference numerals. The description of them will not be repeated hereinafter.

The spiral body 150 of the second electrical wiring means 5 comprises a plurality of conducting wires bundled and coated with insulating materials. The second and third couplers 5c, 5d are provided at the first and second ends of the spiral body 150. As the seat S is moved along the stationary rails 3, the spiral body 150 of the second electrical wiring means 150 can be straightened.

Figure 13:
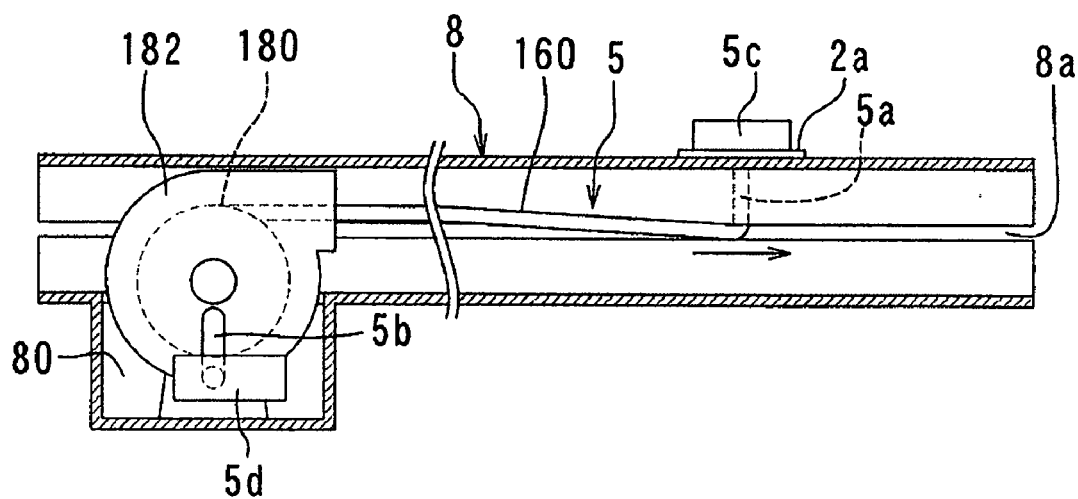
FIG. 13 is a schematic sectional view of housing means employed in the seat shown in FIG. 12.
Figure 12:
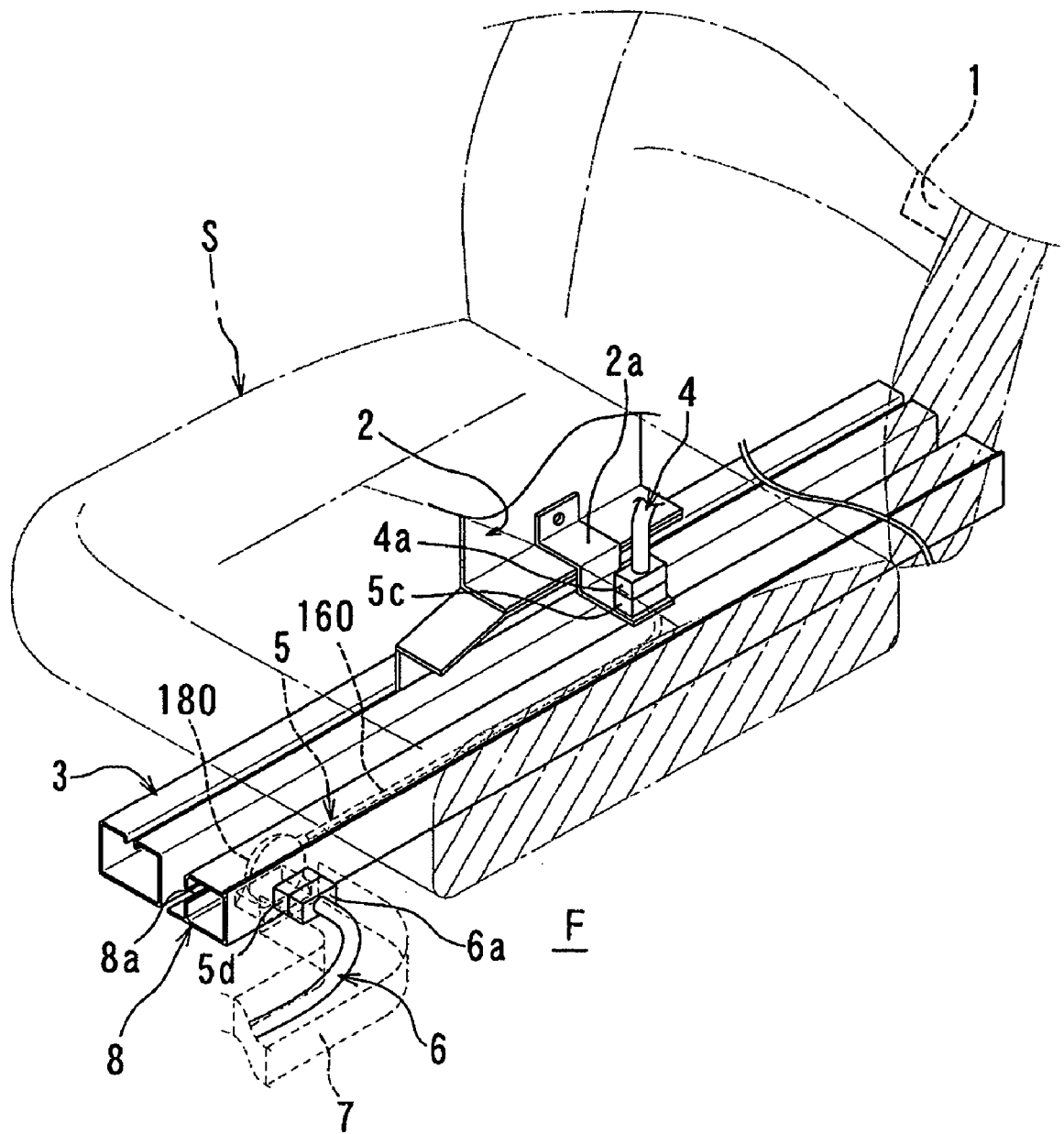
FIG. 12 is a schematic perspective view showing a fourth modification of the vehicle seat.

Referring to FIGS. 12 and 13, there is illustrated a fourth modification of the vehicle seat shown in FIG. 1. This modification is substantially similar to the vehicles seat shown in FIGS. 1 and 11 except that the second electrical wiring means comprises a straight isolated conductor 160 and a reel 180 for taking up the straight isolated conductor 160 is employed. In FIGS. 12 and 13, components that are substantially similar to those of the vehicle seats shown in FIGS. 1 and 11 are designated by the same reference numerals. The description of them will not be repeated hereinafter.

In the modification shown in FIGS. 12 and 13, the housing means 8 has a room 80 projecting downward from the bottom portion thereof as shown in FIG. 13. The housing means 8 is attached to the floor section F of the vehicle with the room 80 being embedded in the floor section F of the vehicle. The reel 180 is received in the room 80 and rotatably supported to the housing means 8 by a support pin (not shown). The reel 180 is covered by a reel cover 182 and always urged in a direction by a return spring (not shown) mounted on the support pin. The isolated conductor 160 comprises a plurality of flexible conducting wires coated with insulating material, and is wound around the reel 180. A portion of the isolated conductor 160 which is adjacent the second end 5b of the isolated conductor 160 is fastened to the reel 180. The third coupler 5d provided at the second end 5b of the second electrical wiring means 160 penetrates a wall of the room 80, supported to the wall of the room 80, and is coupled to the fourth coupler 6a of the third electrical wiring means 6. The isolated conductor 160 is drawn out of the reel 180. The first end 5a of the isolated conductor 160 is led out of the housing means 8 through the slit 8a of the housing means 8. The second coupler 5c that is provided at the first end 5a of the isolated conductor 160 is coupled to the first coupler 4a of the first electrical wiring means 4.

In the example shown in FIGS. 12 and 13, when the seat S is moved along the stationary rails 3 in a rearward direction, the isolated conductor 160 is drawn out of the reel 180. As the seat S is moved along the stationary rails 3 in a forward direction, the real 180 is rotated in such a direction as to be urged by the return spring, whereby the isolated conductor 160 is automatically wound around the reel 180.

Figure 14:
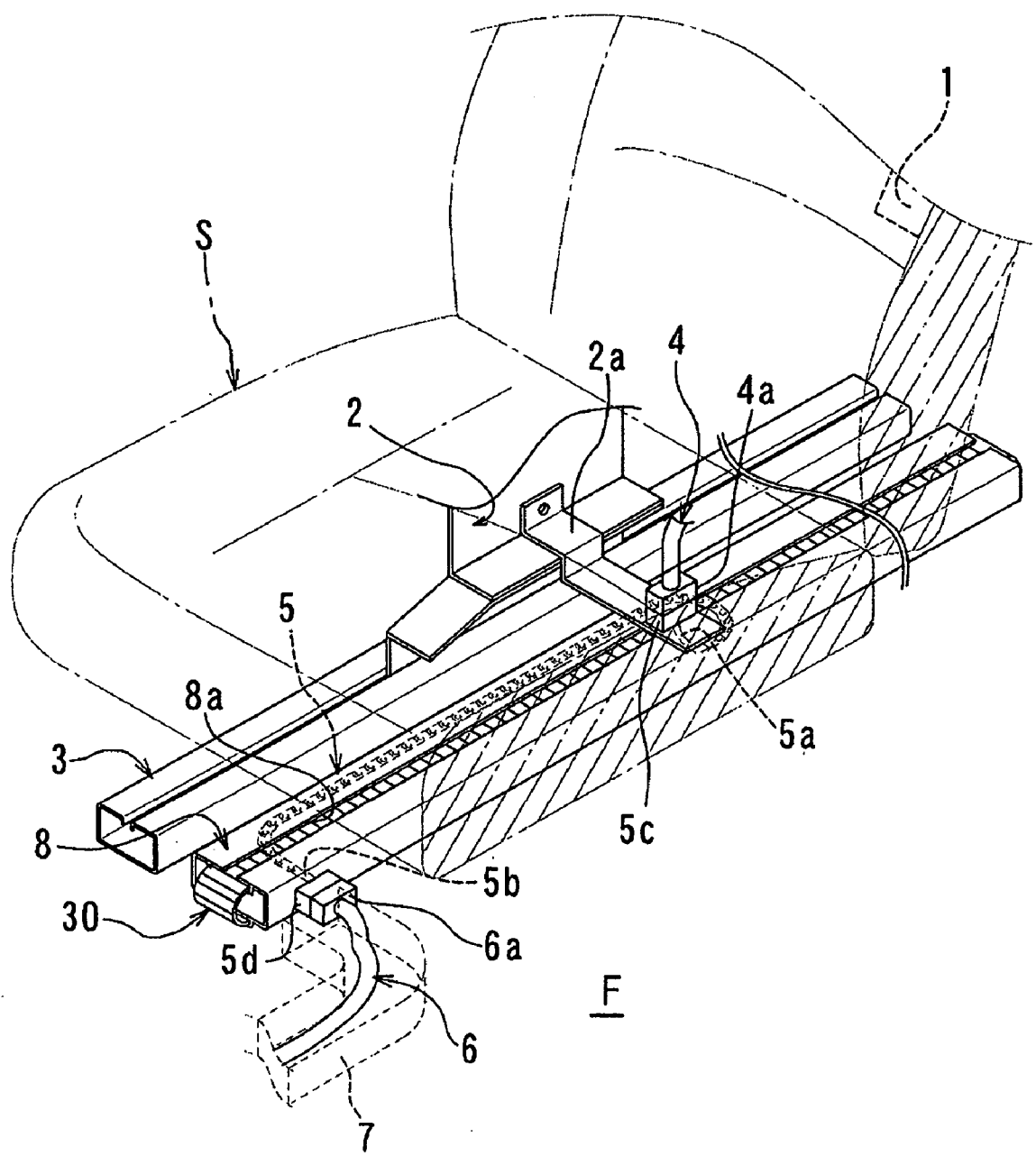
FIG. 14 is a schematic perspective view showing a vehicle seat that is provided with shutter means for closing a slit of housing means.

Referring to FIG. 14, there is illustrated a vehicle seat which is provided with shutter means 30 for closing the longitudinally extending slit 8a of the housing means 8. The shutter means 30 may be employed in each of the vehicle seats shown in FIGS. 1 and 11.

FIG. 14 illustrates the vehicle seat provided with the shutter means 30, in which the longitudinally extending slit 8a of the housing means 8 is formed in the upper portion of the housing means 8 and the second electrical wiring means 5 shown in FIG. 2 is employed. As will be discussed in greater detail hereinafter, the shutter means 30 is movably supported through shutter guide means to the housing means 8 within which the second electrical wiring means 5 is housed. The shutter means 30 has a substantially longitudinal endless body like a caterpillar.

Figure 15:
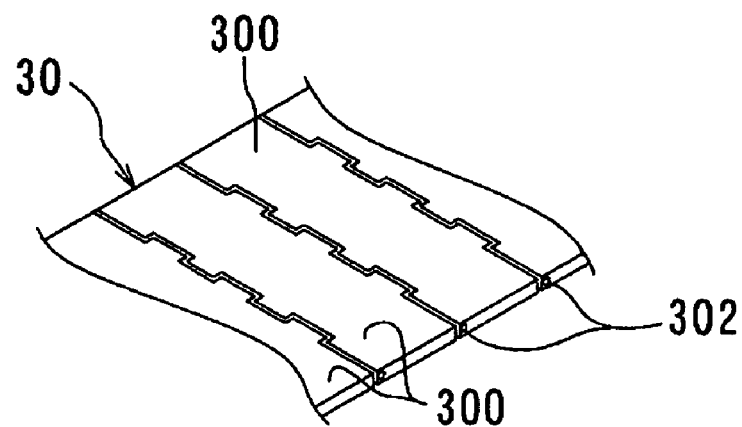
FIG. 15 is a schematic fragmentary perspective view of the shutter means employed in the vehicle seat of FIG. 14.

Referring to FIG. 15, there is illustrated the longitudinal endless body of the shutter means 30. The longitudinal endless body of the shutter means 30 comprises a plurality of narrow strips 300 which are disposed adjacent one another and connected to one another by hinge pins 302.

Figure 16:
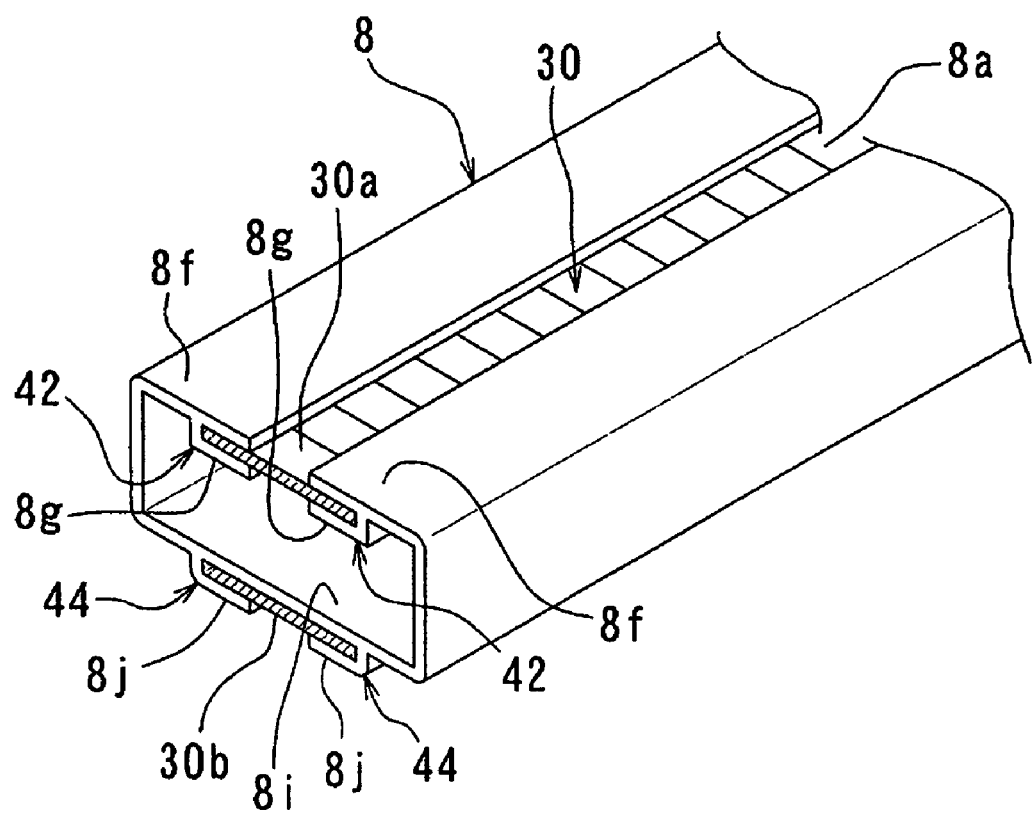
FIG. 16 is a schematic fragmentary perspective view of housing means shown in FIG. 14 and of assistance in explaining shutter guide means.

Referring to FIG. 16, there is illustrated the shutter guide means. The shutter guide means comprises a pair of spaced apart upper receiving mouth portions 42 of a substantially U-shape in cross-section and a pair of spaced apart lower receiving mouth portions 44 of a substantially U-shape in cross-section. Each of the upper receiving mouth portions 42 is formed by the upper portion 8f of the housing means 8 and a longitudinal plate portion 8g of a substantially L-shape in cross-section which is provided on an inner surface of the upper portion 8f of the housing means 8 and extends along the longitudinal direction of the housing means 8. A horizontal region of the substantially L-shaped plate portion 8g is parallel to the upper portion 8f of the housing means 8. Each of the lower receiving mouth portions 44 is formed by the bottom portion 8i of the housing means 8 and a longitudinal plate portion 8j of a substantially L-shape in cross-section which is provided on an outer surface of the bottom portion 8i of the housing means 8 and extends along the longitudinal direction of the housing means 8. Openings of the upper receiving mouth portions 42 are opposed to each other. Also, openings of the lower receiving mouth portions 44 are opposed to each other.

An upper portion 30a of the shutter means 30 is received in the openings of the upper receiving mouth portions 42 and sidably supported by the upper receiving mouth portions 42. A lower portion 30b of the shutter means 30 is received in the openings of the lower receiving mouth portions 44 and slidably supported by the lower receiving mouth portions 44. Thus, the shutter means 30 is slidably supported by the shutter guide means so as to extend along the longitudinal direction of the housing means 8 and be turned under the bottom portion of the housing means 8 at both ends of the housing means 8. Incidentally, the lower receiving mouth portions 44 may be provided on an inner surface of the bottom portion 8*i* of the housing means 8.

In the example shown in FIG. 14, the longitudinally extending slit 8*a* of the housing means 8 is closed by the shutter means 30. Therefore, it is possible to prevent dirt and/or dust from going into the housing means 8. Furthermore, a pointed tip end portion of any longitudinal product, for example, an umbrella, can be prevented from accidentally going into the housing means 8 by the shutter means 30.

The longitudinal endless body of the shutter means 30 has an opening (not shown) formed in the upper portion 30*a* thereof. The first end of the second electrical wiring means 5 at which the second coupler 5*c* supported by the arm bracket 2*a* of the movable rail 2 is provided is led out of the housing means 8 through the slit 8*a* of the housing means 8 and the opening of the shutter means 30. When the seat S is moved along the stationary rails 3, the shutter means 30 is traveled along the housing means 8 and the second electrical wiring means 5 is also traveled within the housing means 8.

Figure 17:
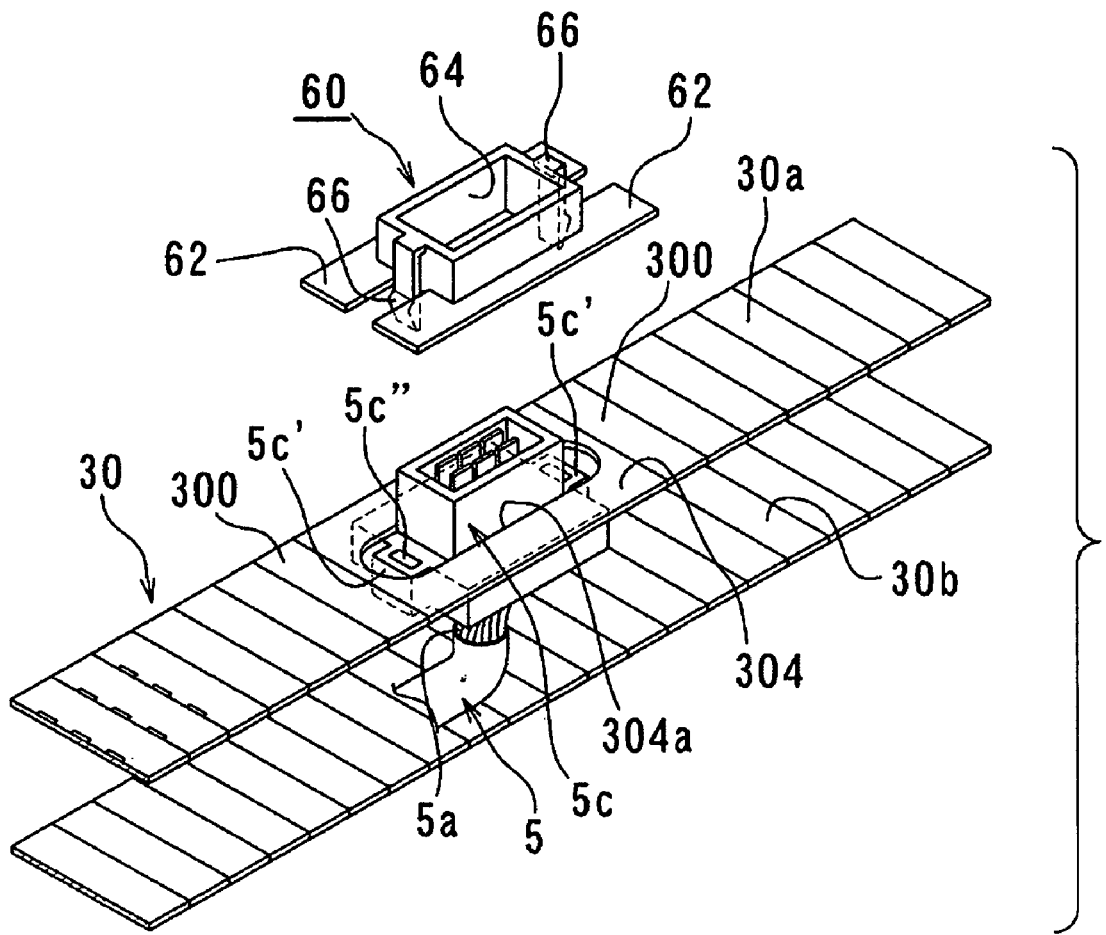
FIG. 17 is a schematic perspective view showing the shutter means, second coupler of second electrical wiring means and a coupler holder, and of assistance in explaining a construction for attaching the second coupler to the shutter means.
Figure 18:
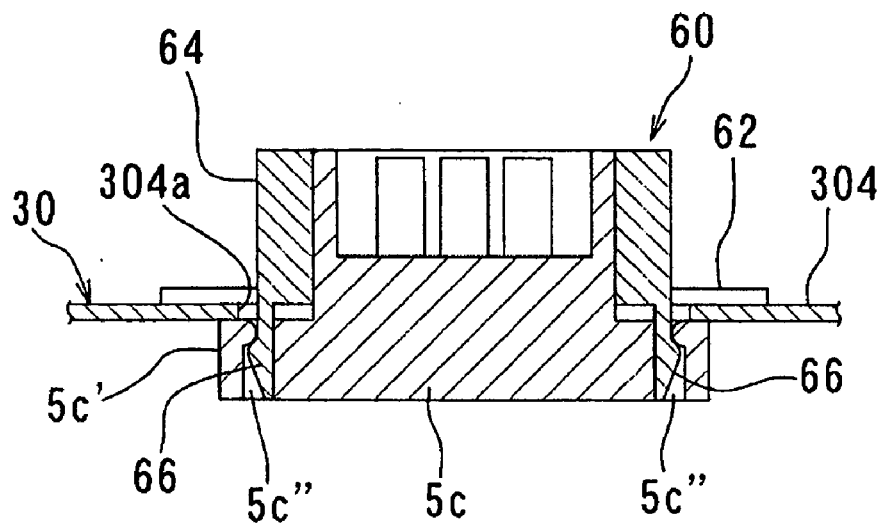
FIG. 18 is a schematic sectional view showing the construction for attaching the second coupler to the shutter means.
Figure 19:
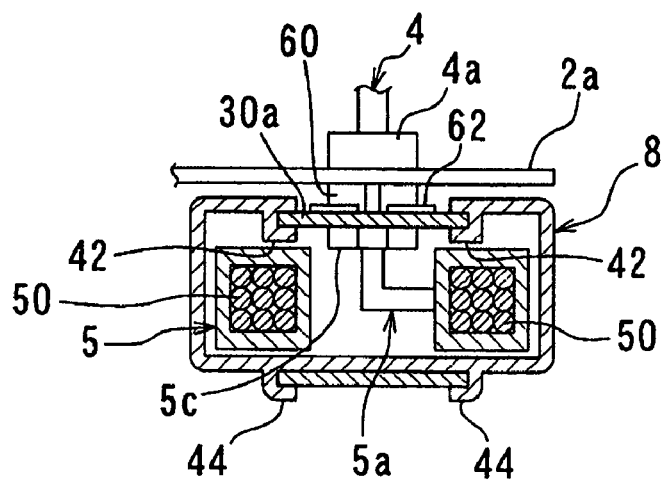
FIG. 19 is a schematic sectional view showing housing means which is employed in the vehicle seat of FIG. 14.

Referring to FIGS. 17–19, the second coupler 5*c* may be provided at the upper portion 30*a* of the shutter means 30 through a coupler holder 60, instead of being supported to the arm bracket of the movable rail. The coupler holder 60 comprises a pair of spaced apart elongated applying plates 62, a frame 64 in which the second coupler 5*c* of the second electrical wiring means 5 is fitted, the frame 64 mounted on the elongated plates 62, a pair of spaced apart engaging pawls 66 projecting downward from sides of the frame 64 through spaces between the applying plates 62. The shutter means 30 has a support plate 304 for supporting the second coupler 5*c* of the second electrical wiring means 5. The support plate 304 is connected between two adjacent narrow strips 300 of the upper portion 30*a* of the shutter means 30 and formed with a through-hole 304*a*. In the illustrated example, the second coupler 5*c* of the second electrical wiring means 5 is provided with a pair of spaced apart flange portions 5*c*' projecting from a body thereof. Each of the flange portions 5*c*' has a receiving hole 5*c*" formed therein. A part of the second coupler 5*c* projects out of the housing means through the through-hole 304*a*. The coupler holder 60 is mounted on the support plate 304 with the engaging pawls 66 being received in the holes 5*c*" of the second coupler 5*c* and engaged with the holes 5*c*", with the applying plates 62 being applied onto the support plate 304, and with the frame 64 receiving the part of the second coupler 5*c* which projects out of the housing means.

Figure 20:
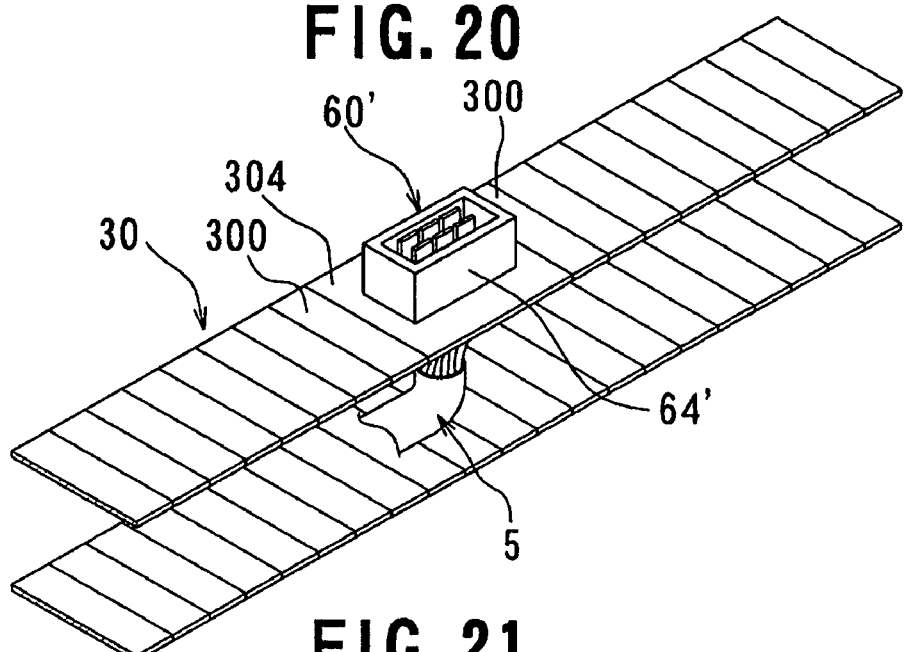
FIG. 20 is a schematic perspective view showing another construction for attaching the second coupler to the shutter means.
Figure 21:
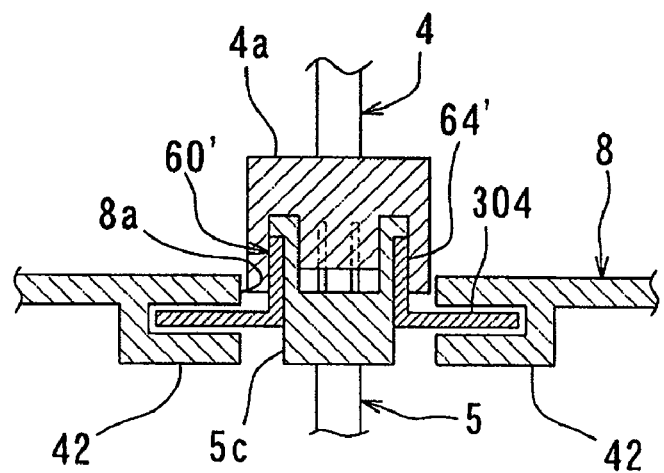
FIG. 21 is a schematic sectional view showing the construction of FIG. 20.

Referring to FIGS. 20 and 21, a coupler holder 60' which is constructed integrally with the shutter means 30 may be employed in lieu of the coupler holder shown in FIGS. 17–19. The coupler holder 60' comprises a frame 64' formed integrally with the support plate 304. The second coupler 5*c* of the second electrical wiring means 5 is fitted in the frame 64'.

In a case where the coupler holder 60 or 60' is employed, the first coupler 4*a* of the first electrical wiring means 4 may be supported to the bracket arm 2*a* of the movable rail 2 (FIG. 14).

Figure 22:
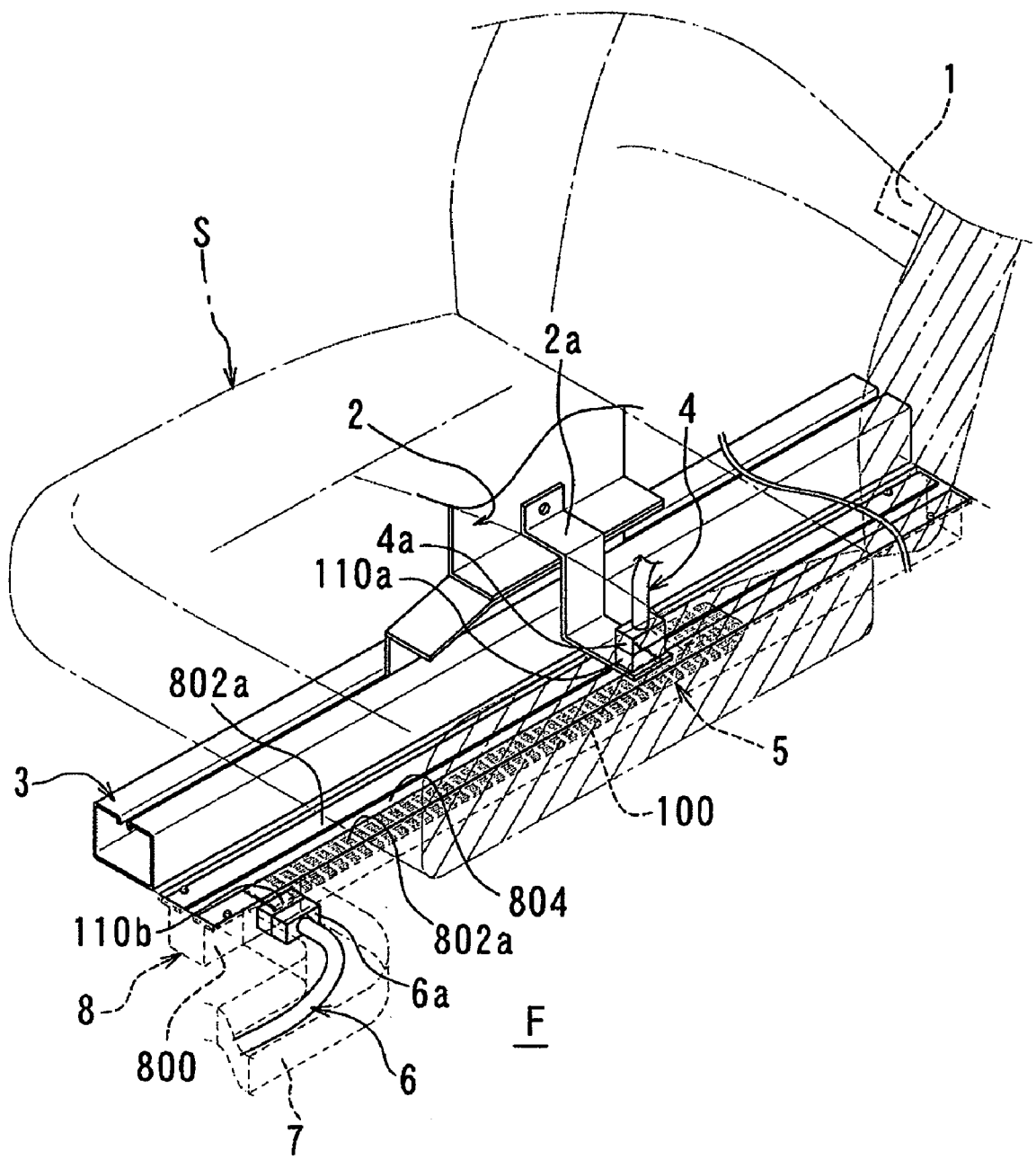
FIG. 22 is a schematic perspective view showing a vehicle seat according to a second embodiment of the present invention.
Figure 23:
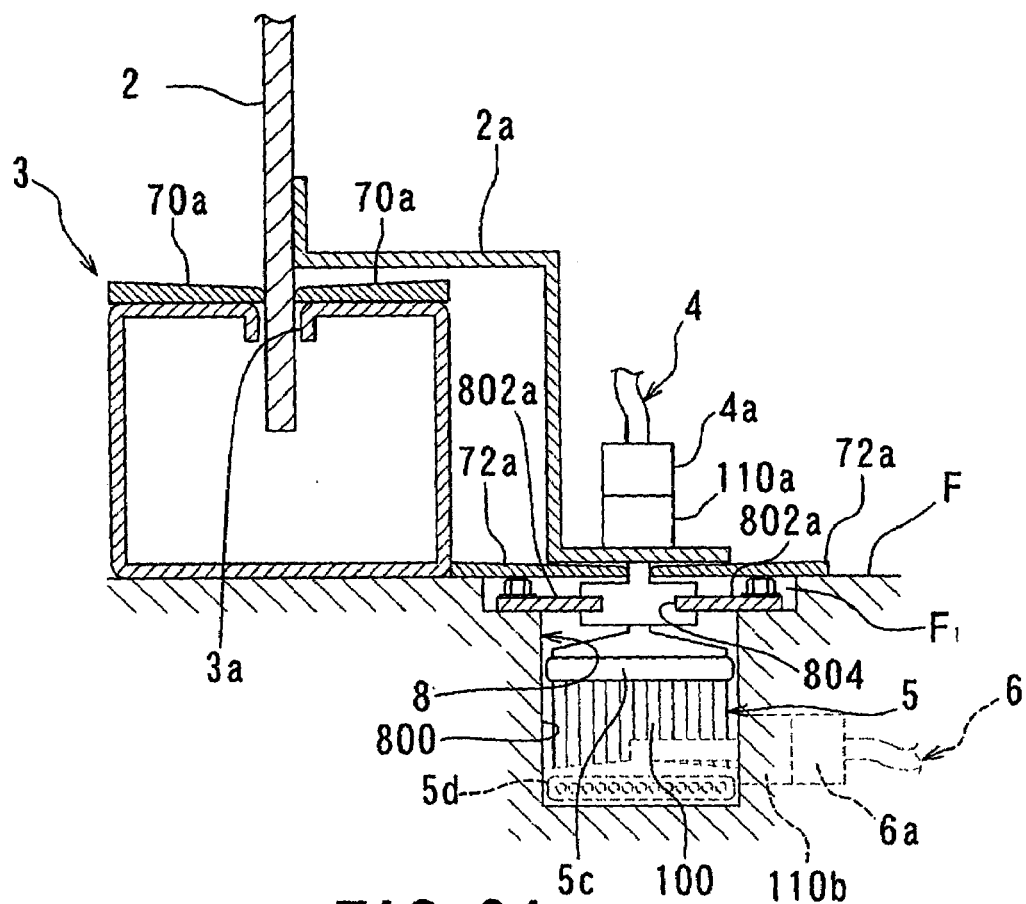
FIG. 23 is a schematic sectional view of the vehicle seat shown in FIG. 22.
Figure 24:
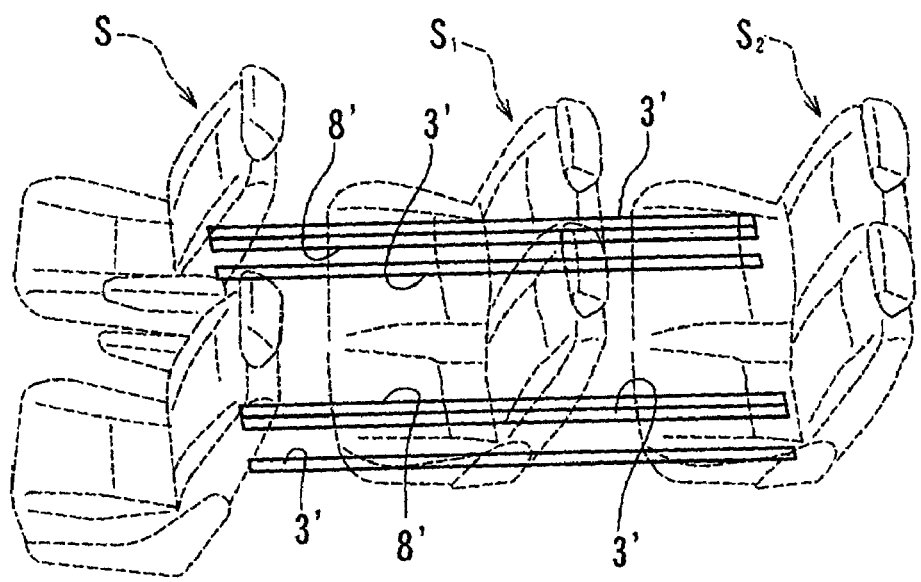
FIG. 24 is a schematic plan view of vehicle seats according to a third embodiment of the present invention.

Referring to FIGS. 22 and 23, there is illustrated a slidable vehicle seat according to a second embodiment of the present invention. This embodiment is substantially similar to the example shown in FIG. 9 except that the housing means 8 comprises a longitudinal groove 800 formed in the floor section F of the vehicle. In this embodiment, the second electrical wiring means 5 shown in FIG. 7 is employed. However, the second electrical wiring means 5 shown in FIGS. 2, 11 and 12 may be employed. In FIGS. 22 and 23, components that are substantially similar to those of the vehicle seat shown in FIG. 9 are denoted by the same reference numerals. The description of them will not be repeated hereinafter.

As described above, the housing means 8 comprises the groove 800 formed in the floor section F of the vehicle. The groove 800 extends along the stationary rail 3. The second electrical wiring means 5 is movably housed within the groove 800. The sixth coupler 110*b* penetrates a side wall of the groove 800 and projects in the passageway 7 which the third electrical wiring means 6 passes. The groove 800 is covered with cover means 802 that comprises a pair of longitudinally extending cover plate members 802*a*. The cover means 802 is mounted on a recess portion $F_1$ of the floor section F of the vehicle so as to close the groove 800 with the cover plate members 802*a* being spaced apart from each other. The fifth coupler 110*a* penetrates the bracket arm 2*a* of the movable rail 2, hangs down from the bracket arm 2*a*, and projects in the groove 800 through a space between the cover plate members 802*a*. The fifth coupler 110*a* is slidapbly supported to the cover plate members 802*a* so as to be slidable along the cover plate members 802*a*. Further, the recess portion $F_1$ of the floor section F of the vehicle is covered with a pair of cover members 72*a* which are mounted on the floor section F and spaced apart from each other. Lip portions are provided at ends of the cover members 72*a* which are adjacent each other. The fifth coupler 110*a* is slidable along a space between the lip portions of the cover members 72*a*. The stationary rail 3 is also covered with a pair of cover members 70*a*. The cover members 70*a* are mounted on the stationary rail 3 so as to close the slit 3*a* of the stationary rail and spaced apart from each other. Lip portions are provided at ends of the cover members 70*a* that are adjacent each other. The movable rail 2 can be slid along a space between the lip portions of the cover members 70*a*.

Referring to FIGS. 24–27, there is illustrated a third embodiment of the present invention. In this embodiment, one of the above-mentioned constructions for connecting the first electrical wiring means of the automotive electronic parts via the second electrical wiring means to the third electrical wiring means connected to the power source is applied to a first bench-type rear seat $S_1$ and a second bench-type rear seat $S_2$ which is arranged in back of the first rear seat $S_1$. Although the electrical wiring means connecting constructions are not shown in FIGS. 24–27, any one of the electrical wiring means connecting constructions discussed above can be employed. Therefore, the description of them will not be repeated hereinafter.

Figure 25:
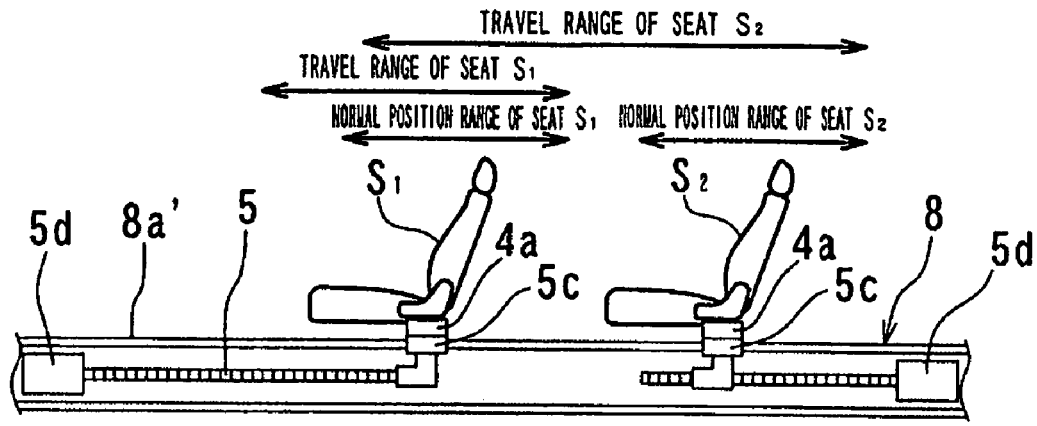
FIGS. 25, 26, and 27 are each a schematic view of assistance in explaining movement of the vehicle seats shown in FIG. 24, and travelling of second electrical wiring means.
Figure 26:
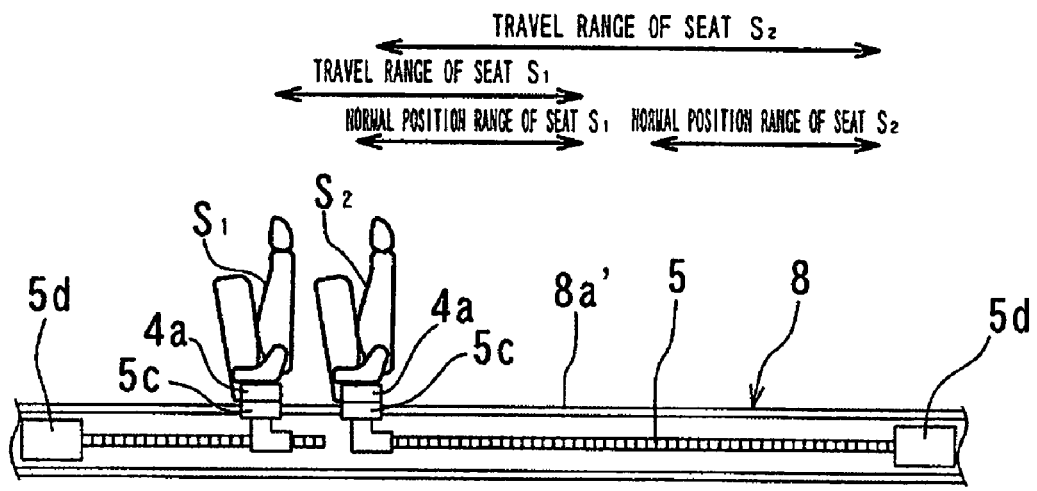
Figure 27:
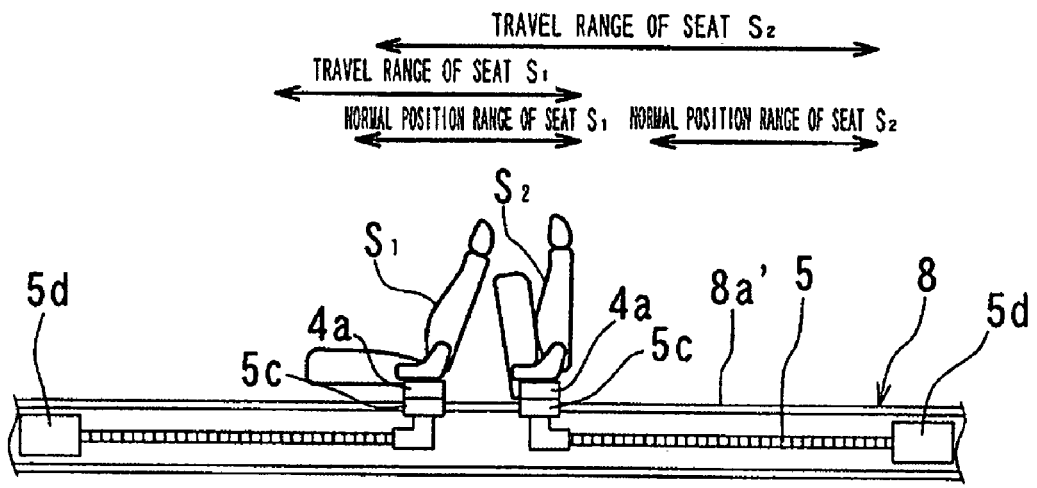

In the embodiment shown in FIGS. 24–27, each of the first and second bench-type rear seats $S_1$, $S_2$ is provided with automotive electronic parts (not shown). The rear seats $S_1$, $S_2$ are adapted to be moved forward and rearward in the vehicle through a seat track mechanism, and are adapted to be jumped up. The seat track mechanism includes two pairs of substantially parallel movable rails (not shown) attached to each of the rear bench seats $S_1$, $S_2$ in slidable relationship with two pairs of substantially parallel stationary rails 3' which are attached to the floor section of the vehicle. Housing means 8' for housing the second electrical wiring means 5 is attached to the floor section of the vehicle and disposed adjacent one of each pair of the stationary rails 3' in parallel with the one of the stationary rails 3'. The housing means 8' comprises a hollow box-like longitudinal body having a longitudinal slit (not shown) of a predetermined width extending along a longitudinal direction of the hollow box-like longitudinal body. In order that the first and second rear bench seats $S_1$, $S_2$ can be moved along the stationary rails 3', the stationary rails 3' is longer than the stationary rails 3 shown in FIGS. 1, 6, 9, 11, 12, 14, and 22. Also, the hollow box-like longitudinal body of the housing means 8' is longer than the longitudinal bodies of the housing means 8 which are shown in FIGS. 1, 6, 9, 11, 12, and 14. Four second electrical wiring means (only two second electrical wiring means 5 are shown in FIGS. 25–27) for connecting four first electrical wiring means (not shown) of the automotive electronic parts provided in the first and second rear seats $S_1$, $S_2$ to four third electrical wiring means (not shown) connected to the power source are housed within the housing means 8'. The four third electrical wiring means pass four passageways (not shown) which are formed in the vehicle floor section in the same as the passageway 7 which is shown in FIGS. 1, 6, 9, 11, 12, 14, and 22 is done.

FIG. 25 illustrates the first and second rear seats $S_1$, $S_2$ that are located within normal position ranges. FIG. 26 illustrates the first and second rear seats $S_1$, $S_2$ which have been moved to first positions where is adjacent the front seat S (FIG. 24), in jumped-up conditions. As the rear seats $S_1$, $S_2$ are moved to the first positions, the second electrical wiring means 5, 5 are traveled within the housing means 8'. FIG. 27 illustrates the first rear seat $S_1$ which is located within the normal position rages, and the second rear seat $S_2$ which has been moved to a second position where is adjacent the first rear seat $S_1$, in a jumped-up condition. As the second rear seat $S_2$ is moved to the second position, the second electrical wiring means 5 for the second rear seat $S_2$ is traveled within the housing means 8'.

In the example shown in FIGS. 24–27, the housing means 8', 8' may comprise grooves formed in the floor section of the vehicle in the same manner as the groove 800 shown in FIGS. 22 and 23 is done. The grooves of the housing means 8, 8, may be covered with cover plate members in the same manner as the groove 800 of the housing means 8 which is shown in FIG. 23 is covered with the cover plate members 802a.

Many examples according to the present invention have been described above. A part of a construction for a certain example can be applied to a construction for another example, as a part of the construction for the another example.

As discussed above, the second electrical wiring means is housed within the housing means, so that the second electrical wiring means can be traveled within the housing means without operatively projecting out of the housing means. Therefore, the second electrical wiring means does not interfere with the passenger's feet. A space under the vehicle seat can be effectively used. Furthermore, the second electrical wiring means is housed within the housing means, thus adding to the appearance of the interior of the vehicle.

It will thus been seen that the objects set forth above, and those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A slidable vehicle seat provided at a body thereof with automotive electronic parts, said slidable vehicle seat comprising:
    a seat track mechanism for allowing said seat to be moved forward and rearward in a vehicle; and
    an electrically wiring construction for said automotive electronic parts;
    longitudinal housing means disposed adjacent said seat track mechanism and provided at a floor section of said vehicle;
    said housing means having a slit extending along a longitudinal direction of said housing means;
    said electrically wiring construction comprising first, second and third electrical wiring means;
    said first electrical wiring means being led out of said automotive electronic parts;
    said third electrical wiring means being connected to a power source and passing in said floor section of said vehicle;
    said second electrical wiring means being movably housed within said housing means so as to be capable of travelling along said housing means according to movement of said seat;
    said second electrical wiring means having first and second ends;
    said first end of said second wiring means being led out of said housing means via said slit and connected to an end of said first electrical wiring means which is distal said automotive electronic parts; and
    said second end of said second electrical wiring means penetrating said housing means, secured to said housing means and connected to an end of said third electrical wiring means which is distal said power source.

2. A slidable vehicle seat as set forth in claim 1, wherein said second electrical wiring means comprises conducting wires and holder means for bundling and holding said conducting wires, said holder means having a flexible, longitudinal hollow body which is formed into a substantially chain-shape and comprises a plurality of piece members which are connected to one another, said conducting wires being received in said hollow body of said holder means.

3. A slidable vehicle seat as set forth in claim 1, wherein said second electrical wiring means comprises a flexible longitudinal body which is formed into a substantially belt-shape and comprises conducting wires which are disposed adjacent one another in parallel, said longitudinal body of said second electrical wiring means being housed within said housing means in a constantly curved condition.

4. A slidable vehicle seat as set forth in claim 1, wherein said second electrical wiring means comprises a spiral isolated conductor.

5. A slidable vehicle seat as set forth in claim 1, wherein said second electrical wiring means comprises a straight isolated conductor, and wherein a reel for taking up said straight isolated conductor is arranged within said housing means.

6. A slidable vehicle seat as set forth in claim 1, wherein said slit of said housing means is covered with cover means comprising cover members which are mounted on said housing means and disposed adjacent each other, said cover members having lip portions provided at adjacent ends thereof.

7. A slidable vehicle seat as set forth in claim 2, wherein said slit of said housing means is covered with cover means comprising cover members which are mounted on said housing means and disposed adjacent each other, said cover members having lip portions provided at adjacent ends thereof.

8. A slidable vehicle seat as set forth in claim 3, wherein said slit of said housing means is covered with cover means comprising cover members which are mounted on said housing means and disposed adjacent each other, said cover members having lip portions provided at adjacent ends thereof.

9. A slidable vehicle seat as set forth in claim 4, wherein said slit of said housing means is covered with cover means comprising cover members which are mounted on said housing means and disposed adjacent each other, said cover members having lip portions provided at adjacent ends thereof.

10. A slidable vehicle seat as set forth in claim 5, wherein said slit of said housing means is covered with cover means comprising cover members which are mounted on said housing means and disposed adjacent each other, said cover members having lip portions provided at adjacent ends thereof.

11. A slidable vehicle seat as set forth in claim 1, wherein said housing means is provided with shutter means for shutting said slit of said housing means, said shutter means movably supported to said housing means so as be capable to travel along the longitudinal direction of said housing means, said first end of said second wiring means penetrating said shutter means.

12. A slidable vehicle seat as set forth in claim 11, wherein said shutter means has a substantially longitudinal endless body like a caterpillar, which comprises a plurality of narrow strips which are disposed adjacent one another and connected to one another by hinge pins.

13. A slidable vehicle seat as defined in claim 11, wherein said shutter means is movably supported to said housing means through shutter guide means.

14. A slidable vehicle seat as defined in claim 12, wherein said shutter means is movably supported to said housing means through shutter guide means.

15. A slidable vehicle seat as defined in claim 11, wherein said first electrical wiring means is provided with a first coupler at an end thereof which is distal said automotive electronic parts, and wherein said second electrical wiring means is provided with a second coupler at said first end thereof, said second coupler being supported to said shutter means through a coupler holder, said first and second couplers being coupled to each other.

16. A slidable vehicle seat as defined in claim 12, wherein said first electrical wiring means is provided with a first coupler at an end thereof which is distal said automotive electronic parts, and wherein said second electrical wiring means is provided with a second coupler at said first end thereof, said second coupler being supported to said shutter means through a coupler holder, said first and second couplers being coupled to each other.

17. A slidable vehicle seat as defined in claim 13, wherein said first electrical wiring means is provided with a first coupler at an end thereof which is distal said automotive electronic parts, and wherein said second electrical wiring means is provided with a second coupler at said first end thereof, said second coupler being supported to said shutter means through a coupler holder, said first and second couplers being coupled to each other.

18. A slidable vehicle seat as defined in claim 14, wherein said first electrical wiring means is provided with a first coupler at an end thereof which is distal said automotive electronic parts, and wherein said second electrical wiring means is provided with a second coupler at said first end thereof, said second coupler being supported to said shutter means through a coupler holder, said first and second couplers being coupled to each other.

19. A slidable vehicle seat as defined in claim 1, wherein said housing means comprises a longitudinal groove formed in said floor section of said vehicle, said second electrical wiring means being movably housed within said groove, said longitudinal groove being covered with second cover members which are mounted on said floor section of said vehicle, said second cover members being spaced apart from each other, whereby said slit is provided between said cover members.

20. A slidable vehicle seat as set forth in claim 19, wherein said second electrical wiring means comprises conducting wires and holder means for bundling and holding said conducting wires, said holder means having a flexible, longitudinal hollow body which is formed into a substantially chain-shape and comprises a plurality of piece members which are connected to one another, said conducting wires being received in said hollow body of said holder means.

21. A slidable vehicle seat as set forth in claim 19, wherein said second electrical wiring means comprises a flexible longitudinal body which is formed into a substantially belt-shape and comprises conducting wires which are disposed adjacent one another in parallel, said longitudinal body of said second electrical wiring means being housed within said longitudinal groove of said housing means in a constantly curved condition.

22. A slidable vehicle seat as set forth in claim 19, wherein said second electrical wiring means comprises a spiral isolated conductor.

23. A slidable vehicle seat as set forth in claim 19, wherein said second electrical wiring means comprises a straight isolated conductor, and wherein a reel for taking up said straight isolated conductor is arranged within said longitudinal groove of said housing means.

24. A slidable vehicle seat as set forth in claim 19, wherein said cover members have lip portions provided at adjacent ends thereof.

25. A slidable vehicle seat as set forth in claim 20, wherein said cover members have lip portions provided at adjacent ends thereof.

26. A slidable vehicle seat as set forth in claim 21, wherein said cover members have lip portions provided at adjacent ends thereof.

27. A slidable vehicle seat as set forth in claim 22, wherein said cover members have lip portions provided at adjacent ends thereof.

28. A slidable vehicle seat as set forth in claim 23, wherein said cover members have lip portions provided at adjacent ends thereof.

29. Slidable vehicle seats provided at bodies thereof with automotive electronic parts, comprising:
   a seat track mechanism for allowing said seats to be moved forward and rearward in a vehicle;
   an electrically wiring construction for automotive electronic parts of each of said seats; and longitudinal housing means disposed adjacent said seat track mechanism and provided at a floor section of said vehicle;

said housing means having a slit extending along a longitudinal direction of said housing means;

said electrically wiring construction comprising first, second and third electrical wiring means;

said first electrical wiring means being led out of said automotive electronic parts;

said third electrical wiring means being connected to a power source and passing in said floor section of said vehicle;

said second electrical wiring means being movably housed within said housing means so as to be capable of travelling along said housing means according to movement of corresponding one of said seats;

said second electrical wiring means having first and second ends;

said first end of said second wiring means being led out of said housing means via said slit and connected to an end of said first electrical wiring means which is distal said automotive electronic parts; and said second end of said second electrical wiring means penetrating said housing means, secured to said housing means and connected to an end of said third electrical wiring means which is distal said power source.

30. Slidable vehicle seats as set forth in claim 29, wherein said second electrical wiring means comprises conducting wires and holder means for bundling and holding said conducting wires, said holder means having a flexible, longitudinal hollow body which is formed into a substantially chain-shape and comprises a plurality of piece members which are connected to one another, said conducting wires being received in said hollow body of said holder means.

31. Slidable vehicle seats as set forth in claim 29, wherein said second electrical wiring means comprises a flexible longitudinal body which is formed into a substantially belt-shape and comprises conducting wires which are disposed adjacent one another in parallel, said longitudinal body of said second electrical wiring means being housed within said housing means in a constantly curved condition.

32. Slidable vehicle seats as set forth in claim 29, wherein said second electrical wiring means comprises a spiral isolated conductor.

33. Slidable vehicle seats as set forth in claim 29, wherein said second electrical wiring means comprises a straight isolated conductor, and wherein a reel for taking up said straight isolated conductor is arranged within said housing means.

34. Slidable vehicle seats as set forth in claim 29, wherein said slit of said housing means is covered with cover means comprising cover members which are mounted on said housing means and disposed adjacent each other, said cover members having lip portions provided at adjacent ends thereof.

35. Slidable vehicle seats as set forth in claim 30, wherein said slit of said housing means is covered with cover means comprising cover members which are mounted on said housing means and disposed adjacent each other, said cover members having lip portions provided at adjacent ends thereof.

36. Slidable vehicle seats as set forth in claim 31, wherein said slit of said housing means is covered with cover means comprising cover members which are mounted on said housing means and disposed adjacent each other, said cover members having lip portions provided at adjacent ends thereof.

37. Slidable vehicle seats as set forth in claim 32, wherein said slit of said housing means is covered with cover means comprising cover members which are mounted on said housing means and disposed adjacent each other, said cover members having lip portions provided at adjacent ends thereof.

38. Slidable vehicle seats as set forth in claim 33, wherein said slit of said housing means is covered with cover means comprising cover members which are mounted on said housing means and disposed adjacent each other, said cover members having lip portions provided at adjacent ends thereof.

39. Slidable vehicle seats as set forth in claim 29, wherein said housing means is provided with shutter means for shutting said slit of said housing means, said shutter means movably supported to said housing means so as be capable to travel along the longitudinal direction of said housing means, said first end of said second wiring means penetrating said shutter means.

40. Slidable vehicle seats as set forth in claim 39, wherein said shutter means has a substantially longitudinal endless body which is formed into a substantially caterpillar-shape and comprises a plurality of narrow strips which are disposed adjacent one another and connected to one another by hinge pins.

41. Slidable vehicle seats as defined in claim 39, wherein said shutter means is movably supported to said housing means through shutter guide means.

42. Slidable vehicle seats as defined in claim 40, wherein said shutter means is movably supported to said housing means through shutter guide means.

43. Slidable vehicle seats as defined in claim 39, wherein said first electrical wiring means is provided with a first coupler at an end thereof which is distal said automotive electronic parts, and wherein said second electrical wiring means is provided with a second coupler at said first end thereof, said second coupler being supported to said shutter means through a coupler holder, said first and second couplers being coupled to each other.

44. Slidable vehicle seats as defined in claim 40, wherein said first electrical wiring means is provided with a first coupler at an end thereof which is distal said automotive electronic parts, and wherein said second electrical wiring means is provided with a second coupler at said first end thereof, said second coupler being supported to said shutter means through a coupler holder, said first and second couplers being coupled to each other.

45. Slidable vehicle seats as defined in claim 41, wherein said first electrical wiring means is provided with a first coupler at an end thereof which is distal said automotive electronic parts, and wherein said second electrical wiring means is provided with a second coupler at said first end thereof, said second coupler being supported to said shutter means through a coupler holder, said first and second couplers being coupled to each other.

46. Slidable vehicle seat as defined in claim 42, wherein said first electrical wiring means is provided with a first coupler at an end thereof which is distal said automotive electronic parts, and wherein said second electrical wiring means is provided with a second coupler at said first end thereof, said second coupler being supported to said shutter means through a coupler holder, said first and second couplers being coupled to each other.

47. Slidable vehicle seats as defined in claim 29, wherein said housing means comprises a longitudinal groove formed in said floor section of said vehicle, said second electrical wiring means being movably housed within said groove, said longitudinal groove being covered with second cover members which are mounted on said floor section of said vehicle, said second cover members being spaced apart from each other, whereby said slit is provided between said second cover members.

48. Slidable vehicle seats as set forth in claim 47, wherein said second electrical wiring means comprises conducting wires and holder means for bundling and holding said conducting wires, said holder means having a flexible, longitudinal hollow body which is formed into a substantially chain-shape and comprises a plurality of piece members which are connected to one another, said conducting wires being received in said hollow body of said holder means.

49. Slidable vehicle seats as set forth in claim 47, wherein said second electrical wiring means comprises a flexible longitudinal body which is formed into a substantially belt-shape and comprises conducting wires which are disposed adjacent one another in parallel, said longitudinal body of said second electrical wiring means being housed within said longitudinal groove of said housing means.

50. Slidable vehicle seats as set forth in claim 47, wherein said second electrical wiring means comprises a spiral isolated conductor.

51. Slidable vehicle seats as set forth in claim 47, wherein said second electrical wiring means comprises a straight isolated conductor, and wherein a reel for taking up said straight isolated conductor is arranged within said longitudinal groove of said housing means.

52. Slidable vehicle seats as set forth in claim 47, wherein said cover members have lip portions provided at adjacent ends thereof.

53. Slidable vehicle seats as set forth in claim 48, wherein said cover members have lip portions provided at adjacent ends thereof.

54. Slidable vehicle seats as set forth in claim 49, wherein said cover members have lip portions provided at adjacent ends thereof.

55. Slidable vehicle seats as set forth in claim 50, wherein said cover members have lip portions provided at adjacent ends thereof.

56. Slidable vehicle seats as set forth in claim 51, wherein said cover members have lip portions provided at adjacent ends thereof.

* * * * *